US009806806B1

(12) United States Patent
Rohde et al.

(10) Patent No.: US 9,806,806 B1
(45) Date of Patent: *Oct. 31, 2017

(54) COHERENT OPTICAL RECEIVER TESTING

(71) Applicant: Coriant Advanced Technology, LLC, New York, NY (US)

(72) Inventors: Bernd-Harald Horst Jurgen Rohde, Munich (DE); Erich Gottwald, Holzkirchen (DE)

(73) Assignee: Elenion Technologies, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,939

(22) Filed: Jul. 7, 2016

(51) Int. Cl.
H04B 10/079 (2013.01)
H04B 10/61 (2013.01)
H04B 10/64 (2013.01)

(52) U.S. Cl.
CPC ... H04B 10/07955 (2013.01); H04B 10/6164 (2013.01); H04B 10/64 (2013.01)

(58) Field of Classification Search
CPC ............... H04B 10/64; H04B 10/6164; H04B 10/07955
USPC .......................................................... 398/38
See application file for complete search history.

(56) References Cited

U.S. PATENT DOCUMENTS

| 8,406,621 | B2 | 3/2013 | Painchaud | |
| 8,565,621 | B2 | 10/2013 | Ibragimov | |
| 8,929,731 | B2 | 1/2015 | Youn | |
| 8,948,614 | B1* | 2/2015 | Schmidt | H04B 10/58 398/208 |
| 2012/0213510 | A1 | 8/2012 | Stojanovic | |
| 2012/0308227 | A1* | 12/2012 | Komaki | H04B 10/25073 398/25 |
| 2013/0156424 | A1* | 6/2013 | Youn | H04B 10/0799 398/38 |
| 2014/0169793 | A1* | 6/2014 | Harley | H04B 10/548 398/79 |
| 2014/0205280 | A1 | 7/2014 | Choe | |
| 2014/0341564 | A1 | 11/2014 | Westlund | |

(Continued)

OTHER PUBLICATIONS

Robert Palmer et al., "Characterization of components for coherent communication systems", Short Course SC 420 OFC (2016) 16 pages.

(Continued)

Primary Examiner — Dalzid Singh
(74) Attorney, Agent, or Firm — Nixon Peabody LLP

(57) ABSTRACT

An heterodyne apparatus and method for measuring performance parameters of a coherent optical receiver at RF frequencies is disclosed. Two coherent lights are launched into signal and LO ports of the receiver with an optical frequency offset f. One of the lights is modulated in amplitude at a test modulation frequency F. COR performance parameters are determined by comparing two frequency components of the COR output. CMRR is determined based on a strength of a direct detection spectral line at the modulation frequency relative to that of spectrally-shifted lines at (F±f). GDV information is obtained by modulating one of the lights at two phase-locked frequencies, such as F and 2F, and comparing phases of two time-domain traces corresponding to frequency components of the COR output signal at the two frequencies.

20 Claims, 15 Drawing Sheets

(56) References Cited

U.S. PATENT DOCUMENTS

2015/0222367 A1\* 8/2015 Olsson ............... H04B 10/6165
398/115
2015/0256266 A1\* 9/2015 Duthel ............. H04B 10/07955
398/38

OTHER PUBLICATIONS

'Novel Approaches for Measuring Frequency Converted Group Delay', by Rohde &Schwarz, slides 40 to 42, Apr. 2010; available from website https://www.ieee.li/pdf/viewgraphs/vna_based_group_delay_measurement.pdf.

\* cited by examiner

COHERENT OPTICAL RECEIVER TESTING

FIELD OF THE INVENTION

The invention generally relates to coherent optical receivers, and more particularly relates to a method and apparatus for testing and characterizing a coherent optical receiver.

BACKGROUND OF THE INVENTION

Coherent optical receivers (COR) are being employed in modern fiber-optic links that utilize coherent optical communication, typically in the form of an integrated coherent receiver (ICR) wherein one or more optical mixers are tightly integrated with output photodetectors, often in a single chip. In order to guarantee a desired level of performance of a COR in a communication network, the receiver has to be extensively tested prior to installation with respect to a set of receiver parameters or characteristics. Receiver performance parameters that are typically measured include the Common Mode Rejection Ratio (CMRR), the group delay variation (GDV), the IQ skew, and the polarization skew.

The CMRR, which is an important parameter of coherent optical receivers, determines the capability of a coherent receiver to select one wavelength out of a number of alien wavelengths; the better the CMMR, the more alien wavelengths can be present without distortion of the communication signal carried by the target wavelength. Besides that, a good CMRR lowers the RIN (Relative Intensity Noise) requirements for an optical local oscillator.

The CMRR is a measure how symmetric the internal structures and photodiode responsivities of a ICR are manufactured, and may be defined as follows:

$$CMRR = 20\log_{10}\left(\frac{I_1(f) - I_2(f)}{I_1(f) + I_2(f)}\right) \quad (1)$$

where f is a frequency at which the CMRR is measured, and $I_1(f)$ and $I_2(f)$ are the electrical currents from two photodiodes that constitute an output differential detector of the ICR.

A typical ICR may include two input optical paths for two polarizations, which may include two optical mixers such as 90 deg optical hybrids, and differential detectors that include pairs of photodiodes followed by trans-impedance amplifiers (TIA) at the output. Accordingly, CMRR, which is a combined measure of optical and electrical imbalances in the ICR, may depend on non-idealities along optical paths, e.g. a non-ideal input optical splitting ratio (≠3 dB), inaccurate path differences, differing PD responsivities, TIA imbalances, and disbalances in front-end electronics such as bond wiring and electrical waveguides.

While measuring the CMRR for the continuous wave case, i.e. for f=0, is a relatively easy task, doing that for non-zero frequencies, e.g. in the RF range spanning megahertz (MHz) to tens of gigahertz (GHz) where the ICRs typically operate, is not trivial. The photodiodes in the IRC are typically wired such that only the differential photodiode component is connected to the output, so that the photodiode currents cannot be accessed individually, and the sum term in the denominator of equation (1) cannot be accessed directly. Therefore, the CMRR at the RF frequencies, i.e. RF-CMRR, is difficult to measure.

Another important parameter of a COR is the GDV. The GDV is a measure related to time distortion of a signal, and may be determined variation of the group delay of a signal in the COR with frequency. The group delay is a measure of the slope of the phase response at any given frequency, and is given by the following equation:

$$\tau_g = \frac{d\Phi(\omega)}{d\omega}$$

However, the GDV may also be difficult to measure in integrated photonic devices based solely on the device output, without access to internal measuring points in the device.

Accordingly, it may be understood that there may be significant problems and shortcomings associated with current solutions and technologies for testing and characterizing coherent optical receivers, including integrated coherent receivers that are used in coherent optical communications.

SUMMARY OF THE INVENTION

Accordingly, an aspect of the present disclosure relates to a method and apparatus for characterizing a coherent optical receiver at one or more modulation frequencies within an operating frequency range thereof.

An aspect of the present disclosure relates to a method for measuring a characteristic of a coherent optical receiver (COR) that comprises one or more optical mixers followed by one or more differential photodetectors, the method comprising a) splitting a light from a coherent light source into first and second lights; b) frequency shifting one of the first or second lights by a frequency shift f; c) modulating the first light in amplitude at a modulation frequency F that is greater than f; d) providing one of the first and second lights into a signal port of the COR, and the other of the first and second lights into a local oscillator (LO) port of the COR; e) recording an output signal of the one or more differential photodetectors from an output port of the COR, said output signal comprising a first frequency component at a shifted modulation frequency (F−f) or (F+f) and a second frequency component; and f) computing the characteristic of the COR based at least in part on the first and second frequency components. The second frequency component may be, for example, a frequency component of the output signal at the modulation frequency F or a shifted harmonic of the modulation frequency (n·F−f) or (n·F+f), where n is an integer.

An aspect of the present disclosure provides a method for measuring a characteristic of a COR that comprises an optical signal port and a local oscillator (LO) port, the method comprising: a) providing first coherent light that is modulated in amplitude at a modulation frequency F into one of the optical signal port or the LO port of the COR; b) providing second coherent light that is shifted in optical frequency from the first coherent light by a frequency shift f into the other one of the optical signal port and the LO port of the COR; c) recording one or more output COR signals from one or more output ports of the COR; and, d) comparing a first frequency component of the one or more output COR signals to a second frequency component thereof to determine the characteristic of the COR.

An aspect of the present disclosure provides a method for measuring a common mode rejection ratio (CMRR) of a COR that comprises one or more differential photodetectors at the output, the method comprising: a) splitting a light from a coherent light source into first and second lights; b) frequency shifting one of the first or second lights by a frequency shift f, c) modulating the first light in amplitude at a modulation frequency F that is greater than f, d) providing one of the first and second lights into a signal port of the COR, and the other of the first and second lights into a local oscillator (LO) port of the COR; e) recording an output signal of the one or more differential photodetectors, said output signal comprising a first frequency component at a shifted modulation frequency (F−f) or (F+f) and a second frequency component at the modulation frequency F; determining relative signal strengths of the first frequency component and the second frequency component; and computing the CMRR for the COR based at least in part on the measured relative strength.

An aspect of the present disclosure provides a method for measuring a CMRR of a COR that comprises an optical signal port, a local oscillator (LO) port, and an output differential detector, the method comprising: a) providing first coherent light that is modulated in amplitude at a modulation frequency F into one of the optical signal port or the LO port of the COR; b) providing second coherent light that is shifted in optical frequency from the first coherent light by a frequency shift f into the other one of the optical signal port and the LO port of the COR; c) recording an output signal of the one or more differential photodetectors, said output signal comprising a first frequency component at a shifted modulation frequency (F−f) or (F+f) and a second frequency component at the modulation frequency F; d) determining relative signal strengths of the first frequency component and the second frequency component; and e) computing the CMRR of the COR based at least in part on the first and second frequency components.

An aspect of the present disclosure relates to an apparatus for measuring a characteristic of a COR. The apparatus comprises one or more coherent light sources configured to provide first and second lights with an optical frequency shift f therebetween, and first and second output optical ports for coupling one of the first and second lights into a local oscillator (LO) port of the COR and the other of the first and second lights into an optical signal (OS) port of the COR. An optical modulator is disposed in an optical path of the first light and is operable to modulate the first light in amplitude at a modulation frequency F>f. An electrical signal recorder is further provided that is configured to connect to an output port of the COR and to record an output COR signal received therefrom, said output COR signal comprising a first frequency component and a second frequency component. A controller is coupled to the electrical signal recorder and is configured to determine the characteristic of the COR based at least in part on the first and second frequency components.

An aspect of the present disclosure relates to an apparatus for measuring a characteristic of a COR. The apparatus comprises an optical splitter for splitting light from a coherent light source into first and second lights, and first and second output optical ports for coupling one of the first and second lights into a local oscillator (LO) input port of the COR and the other of the first and second lights into a signal input port of the COR. An optical modulator is disposed in an optical path of the first light and is operable to modulate the first light in amplitude at a modulation frequency F. An optical frequency shifter is disposed in an optical path of one of the first and second lights and is operable to shift an optical frequency of light passing therethrough by a frequency shift f<F. An electrical signal recorder configured to connect to an output port of the COR and to record an output signal received therefrom, said output signal comprising a first frequency component at a shifted modulation frequency (F−f) or (F+f) and a second frequency component. A controller is coupled to the electrical signal recorder and configured to determine the characteristic of the COR based at least in part on the first and second frequency components. The second frequency component may be, for example, a frequency component of the output signal at the modulation frequency F or a shifted harmonic of the modulation frequency (n·F−f) or (n·F+f), where n is an integer.

An aspect of the present disclosure relates to an apparatus for measuring a CMRR of a COR. The apparatus comprises: an optical splitter for splitting light from a coherent light source into first and second lights; first and second output optical ports for coupling one of the first and second lights into a local oscillator (LO) input port of the COR and the other of the first and second lights into a signal input port of the COR; an optical modulator disposed in an optical path of the first light and operable to modulate the first light in amplitude at a modulation frequency F; and an optical frequency shifter disposed in an optical path of one of the first and second lights and operable to shift an optical frequency of light passing therethrough by a frequency shift f<F. An electrical signal recorder is configured to connect to an output port of the COR and to record an output signal received therefrom, said output signal comprising a first frequency component at a shifted modulation frequency (F−f) or (F+f) and a second frequency component at the modulation frequency F. A controller is coupled to the electrical signal recorder and configured to determine the CMRR of the COR based at least in part on a relative strengths of the first and second frequency components in the spectrum of the output signal of the COR.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION OF THE INVENTION

Figure 1:
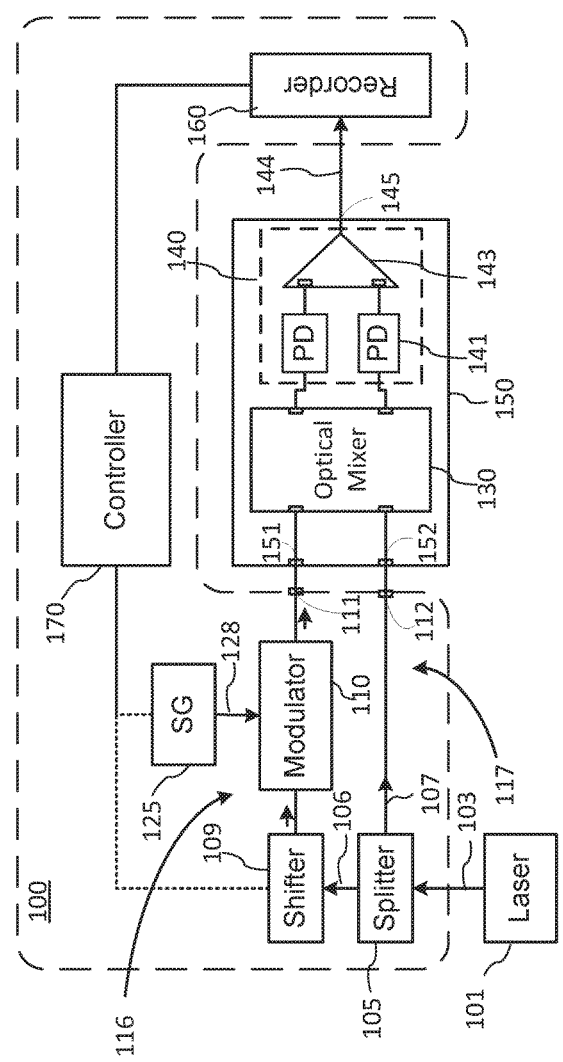
FIG. 1 is a schematic block diagram of an apparatus for testing a coherent optical receiver (COR)

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Furthermore, the following abbreviations and acronyms may be used in the present document:
CMRR Common Mode Rejection Ratio
GDV Group Delay Variation
COR Coherent Optical Receiver
ICR Integrated Coherent Receiver
RF Radio Frequency
DSP Digital Signal Processor
FPGA Field Programmable Gate Array
ASIC Application Specific Integrated Circuit Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by a device, component, or circuit, is to be understood as referring to an action performed by device, component, or circuit itself or by an element thereof rather than by an external agent. The term 'analog' refers to signals that encode information in a continuously varying parameter or parameters, such as for example electrical field, voltage, or current, and to circuits configured to respond to the continuously varying parameter or parameters to process that information; the term 'analog' may be used herein to distinguish from digital signals or circuits that encode or process information by switching between a finite set of values or states. In the context of the present disclosure, "RF" may refer to frequencies ranging from a few kilohertz (kHz) to tens of gigahertz (GHz).

With reference to FIG. 1, there is schematically illustrated a block diagram of an example test apparatus 100 configured for characterization of a COR 150 under test. The test apparatus 100 may also be referred to herein as the apparatus 100 or as the setup 100. The COR 150 includes two input optical ports 151 and 152, one of which serves as a signal input port and the other as an input port for a Local Oscillator (LO). Within COR 150 these optical ports are optically coupled to inputs of an optical mixer 130, which outputs are coupled to a differential detector 140; although only one differential detector is shown, more than one could be present to detect light from other output ports of the mixer 130, if present. The differential detector 140 may be formed of a pair of photodetectors, such as photodiodes (PD), and an output TIA 143. It will be appreciated that the optical mixer 130 may include more than two output ports, and COR 150 may include more than one optical mixer 130. For certainty in the following description the optical port 152 is assumed to be the LO port of COR 150, and the input optical port 151 is assumed to be the signal port of COR 150.

In the illustrated embodiment, the apparatus 100 includes at its input an optical splitter 105 for splitting light 103 from a coherent light source 101 into first and second lights 106 and 107, which are then directed along two optical paths 116, 117 to first and second output optical ports 111, 112 of the test apparatus 100. The optical paths 116, 117 in the apparatus 100 may also be referred to herein as the two arms of the apparatus or the two arms of the setup. The output optical ports 111, 112 of the test apparatus 100 are configured to connect to the LO and signal ports of COR 150 so that one of the first and second lights can be coupled into the LO port 152 of COR 150 and the other of the first and second lights—into the optical signal port of COR 150. In the illustrated configuration, the first light 106 is coupled during measurements into the signal port 151 of the COR under test, and the second light 107 is coupled into the LO port 152 of COR 150.

An optical frequency shifter (OFS) 109 may be disposed in the optical path 116 of the first light 106 to the first output optical port 111 and is operable to shift an optical frequency of light passing therethrough by a frequency shift f. The OFS 109 may be embodied, for example, using an acousto-optic modulator, which is known in the art to shift the optical frequency of light it receives by a frequency of an acoustic wave generated therein. Other embodiments of the OFS 109 may also be envisioned, such as for example using an optical modulator followed by an optical filter. In another embodiment the OFS 109 may be disposed in the optical path 117 to the second output port 112 for coupling frequency-shifted light into the LO input port 152 of COR 150.

An optical modulator (OM) 110 is operable to modulate light passing therethrough in intensity at a first modulation frequency F>f, and optionally also at one or more other modulation frequencies in some embodiments, as described hereinbelow. The first modulation frequency F may also be referred to herein as the base modulation frequency or simply as the modulation frequency F. The optical modulator 110 is shown to be disposed in the optical path 116 of the first light 106 after the OFS 109, but in other embodiments may be disposed before the OFS 109 or in the optical path 117 of the second light 107 for coupling into the LO port of COR 150. A variable-frequency electrical signal generator (SG) 125 is coupled to the optical modulator 110 for driving it with an electrical modulation signal at the desired first modulation frequency F, and in some embodiments at more than one modulation frequencies.

Generally, each of the OM 110 and the OFS 109 may be disposed in any order and in any of the two optical paths 116, 117 between the beam splitter 105 and the output ports 111 and 112 within the apparatus 100.

Figure 15:
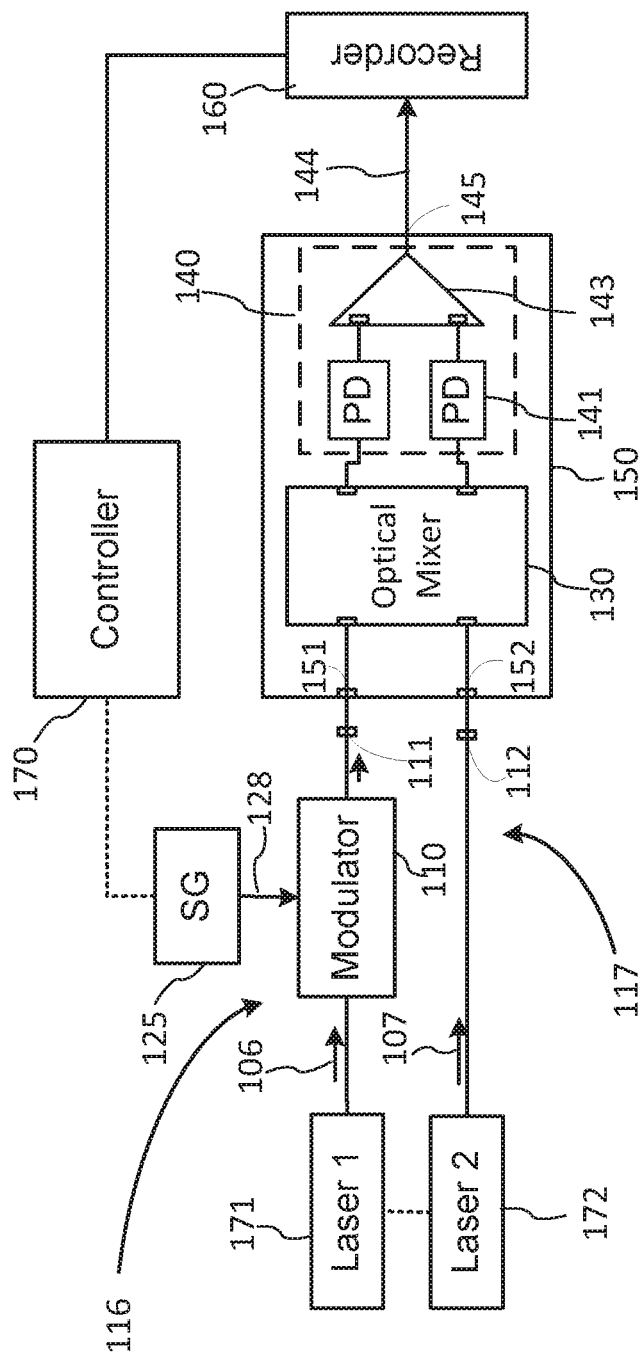
FIG. 15 is schematic block diagram of an embodiment of an apparatus for testing a COR using light from two different coherent optical sources to feed the LO and signal ports of the COR.

The coherent light source 101 may be, for example, in the form of a single-frequency laser that is capable of emitting coherent radiation at an operating wavelength of the COR 150 under test. The coherent light source 101 may be, for example a wavelength-stabilized narrow-linewidth semiconductor laser of a type conventionally used as local oscillators for coherent optical receivers. In some embodiments the coherent light source 101 may be included within the apparatus 100. In another embodiment, such as that illustrated in FIG. 15, the first and second lights 106, 107 may be generated by two different coherent light sources 171 and 172 that may be frequency-locked to operate at a same optical frequency or with a fixed difference fin their optical frequencies, and the optical splitter 105 may be omitted. In embodiments wherein the two coherent light sources emit light at optical frequencies that stably differ by the desired frequency shift f, the OFS 109 may be omitted, as illustrated in FIG. 15.

The test apparatus 100 may further include an electrical signal recorder 160 that is configured to connect to an output port of COR 150 to receive an output electrical signal 144 from an output COR port 145, which is fed from the differential detector 140. The electrical signal recorder 160, which may be referred to hereinafter simply as the recorder 160, may include internal circuitry that is configured to detect and/or record the COR output signal 144, and may also be configured to extract therefrom desired signal strength or phase parameters of one or more spectral components of the received signal, for example those that correspond to various linear combinations of the base modulation frequency F and the optical frequency shift f A controller 170 coupled to the recorder 160 may further be provided for controlling various modules of the apparatus 100, and for computing a desired performance characteristics of COR 150 based on the data extracted by the recorder 160 from the output COR signal 144. The controller 170 may also be configured to extract the desired signal strength or phase parameters from the signal and/or signals recorded by the recorder 160. It will be appreciated that the recorder 160 and the controller 170 may share a same digital processor for at least some of their functions, or may use different digital processors.

Advantageously, apparatus 100 provides a setup for coherent heterodyne measurement of COR 150 that enables simplified and low noise processing of the COR output signal to obtain data pertinent to a number of performance parameters of the COR under test.

Figure 2:
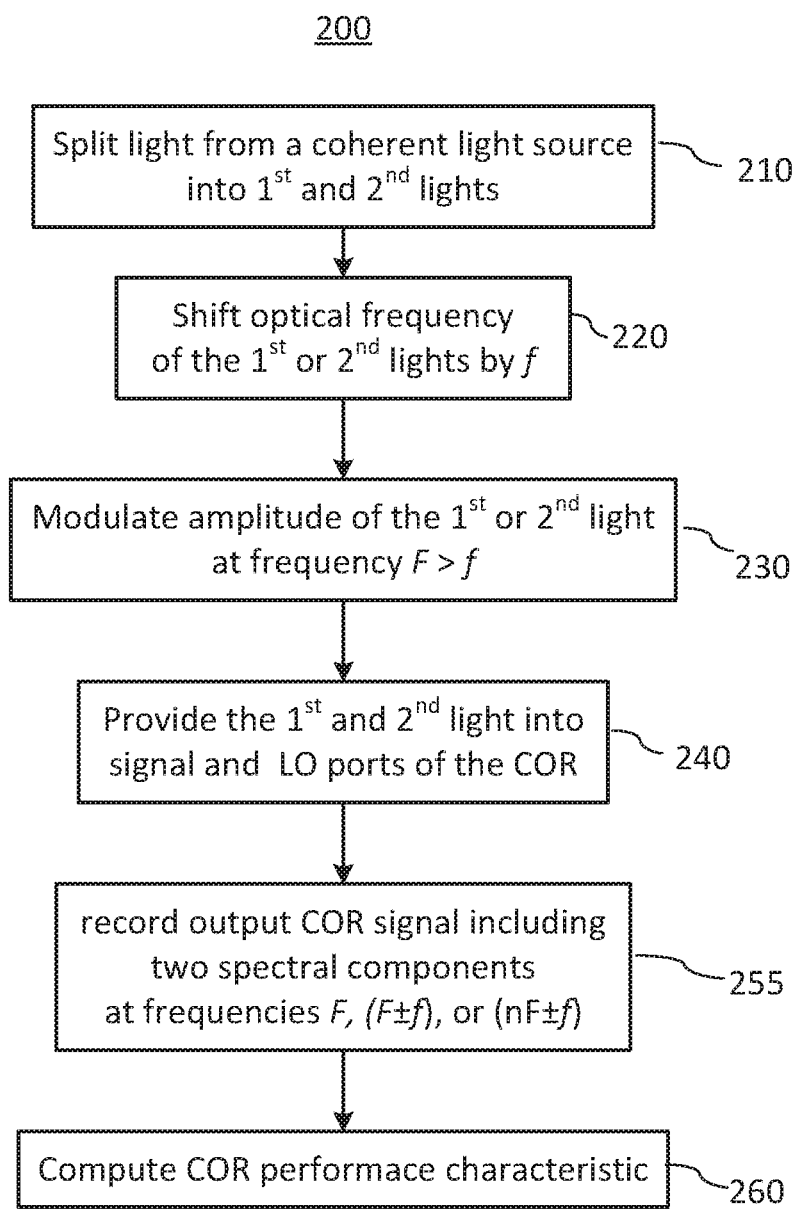
FIG. 2 is a flowchart of a method for testing a COR using the apparatus of FIG. 1.

Referring now to FIG. 2, there is illustrated a flowchart of a method 200 for measuring a performance characteristic of COR 150 using the apparatus 100 according to an embodiment of the present disclosure. In the illustrated embodiment, the method starts with a step or operation 210 of splitting the light 103 from a coherent light source 101 into first and second lights 106, 107 using the optical beam splitter 105. At step or operation 220, the first light 106 or the second light 107 is frequency shifted by the frequency shift f. In embodiments wherein the $1^{st}$ and $2^{nd}$ light are produced from two different coherent optical sources and differ in optical frequency by the optical frequency shift f, steps 210 and 220 may be omitted. At step or operation 230, either the first or the second light is modulated in amplitude at a modulation frequency F>f using a suitable optical modulator such as the optical modulator 110. The operations of the optical frequency shifting and modulating can be performed in any order, and on either of the first and second lights. One of the first and second lights is then provided into a local oscillator (LO) input port of the COR 150, and the other of the first and second lights into the signal port of the COR 150, as indicated at 240. At step or operation 255 the recorder 160 detects and, preferably, records the output signal 144 that is produced by the differential detector 140 under test in response to launching the first and second lights into its input optical ports and appears at the output port of the COR. The output signal 144 recorded by the recorder 160, which may also be referred to herein as the COR output signal, includes a first frequency component $S_1$ at a shifted modulation frequency (F−f) or (F+f) and a second frequency component $S_2$. The second frequency component may be, for example, a component of the output COR signal at the modulation frequency F or a shifted harmonic of the modulation frequency (n·F−f) or (n·F+f), where n=1, 2, . . . is an integer. The term 'frequency component' is used herein to refer to a spectral component of the recorded signal at a specified frequency. In some embodiments the recorder 160 may separately record and compare the first and second frequency components of the COR output signal 144, which may include spectral components thereof at two of the following frequencies: the modulation frequency F, the shifted modulation frequencies (F±f), a second harmonic of the modulation frequency 2F, and the shifted second harmonic (2F±f) of the modulation frequency F. The base modulation frequency F may be varied during the measurement to obtain the frequency dependence of the COR performance characteristic being measured. At step or operations 260, one or more performance parameters or characteristics of the COR 150 under test may be computed by the controller 170 based at least in part on the first and second frequency components. It will be appreciated that the operations described hereinabove with respect to steps 255 and 260 may be performed using either the controller 170 or the recorder 160, depending on a particular implementation of the test apparatus 100.

In one embodiment the apparatus 100 may be configured to implement an embodiment of method 200 to measure a CMRR of a COR under test, such as COR 150. In this embodiment the second frequency component $S_2$ refers to the spectral component of the received COR signal 144 at the base modulation frequency F, and step 260 may include determining the spectral components of the COR output signal 144 at the base modulation frequency F and at one or both of the shifted modulation frequencies $F^+=(F+f)$ and $F^-=(F-f)$, and computing the CMRR based at least in part on the relative signal strength S(F) at the modulation frequency F as compared to the signal strength $S(F^\pm)$ at least one of the shifted modulation frequencies $F^+=(F+f)$ and $F^-=(F-f)$. By way of example, f may be in the range from a few megahertz (MHz) to several tens of MHz, while the base modulation frequency F is typically at least several times greater, and may be for example in the range of a few hundred MHz to tens of GHz. The base modulation frequency F may be varied by the controller 170 across a specified modulation frequency range of the COR under test, and steps 230-260 repeated for a plurality of values of F in order to determine CMRR values at a plurality of modulation frequencies.

Principles of the CMRR measurement using the apparatus 100, or a suitably configured embodiment thereof, may be understood by considering the relationship between the COR output signal 144 at the recorder 160 and the first and second lights 106, 107 at the inputs of the optical mixer 130 of the COR under test. In the optical mixer 130, the first light 106 is coherently mixed with the second light 107. The optical mixer 130 is conventionally configured so that the photocurrents $I_1$ and $I_2$ generated by the PDs 141 are proportional to $|E_{sig}+E_{LO}|^2$ and $|E_{sig}-E_{LO}|^2$, respectively, and the COR output signal 144, which is taken from the output of the differential detector 140, is typically proportional to a difference $\Delta I$ between these photocurrents, $\Delta I = I_1 - I_2$. Here $E_{LO}$ and $P_{LO}$ denote the optical field and the optical power at the LO input of the optical mixer 130, and $E_{sig}$ and $P_{sig}$ denote the optical field and the optical power at the signal input of the optical mixer 130. In an ideal COR with an ideal differential detector 140 at the output, the following relationship holds:

$$\Delta I = I_1 - I_2 \propto 2 Re\{E_{sig} \cdot E_{LO}^*\} \quad (2)$$

so that all "direct detection" (DD) terms proportional to $P_{sig}(t)=|E_{sig}(t)|^2$ and $P_{LO}(t)=|E_{LO}(t)|^2$ in the output COR signal 144 are eliminated, indicating a perfect common mode rejection. However, internal imbalances in a real-life COR with a differentially-sources output may result in these DD terms being preserved, limiting the CMRR.

Due to the optical frequency shift f in one arm of the setup 100 relative to the other arm, COR 150 is operated in the apparatus 100 under heterodyne conditions with a fixed intermediate frequency f<F. With an ideal heterodyne differential detection, the coherent beating of the signal and LO lights described by the right-hand side of equation (2) results in a spectral line corresponding to the modulation frequency F being replaced in the output signal of the differential detector 140 with two modulation spectral lines at the shifted modulation frequencies $F^+=(F+f)$ and $F^-=(F-f)$. The presence of the common mode signal in the COR output may be assessed by the presence of the signal component at the modulation frequency F at the output of the differential detector 140.

Figure 3:
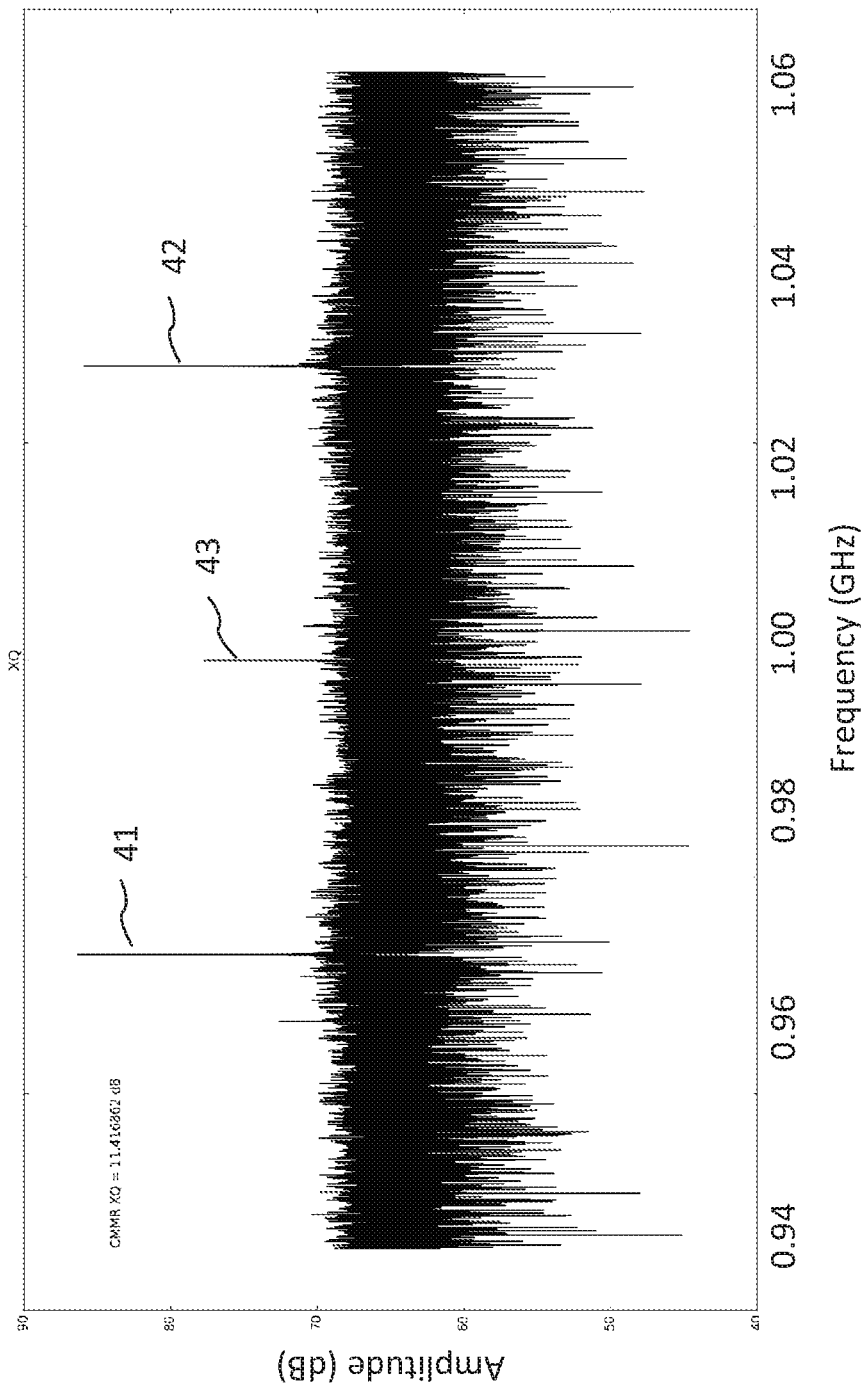
FIG. 3 is a graph of an example measured spectrum of an output electrical signal of the COR when tested using the apparatus of FIG. 1 with the modulation frequency F of 1 GHz and the optical frequency shift f=27.12 MHz.

FIG. 3 shows by way of example a portion of the spectrum of the output COR signal 144 centered about the modulation frequency F for an example case of the base modulation frequency F=1 GHz and the optical frequency offset f=27.12 MHz. With the heterodyne detection, the spectral line corresponding to the modulation frequency F=1 GHz is shifted by +/−27.12 MHz, resulting in the two shifted modulation spectral lines 41 and 42 at the shifted modulation frequencies $F^+=(F+f)\cong1.027$ GHz and $F^-=(F-f)\cong0.977$ GHz; these lines originate from the coherent detecting terms as illustrated by equation (2). The spectral peak 43 at the modulation frequency F=1 GHz is also visible; this peak stems from the non-coherent direct detection terms as described hereinabove. The CMRR of a COR being tested by the apparatus 100 may be determined from the relative signal strengths of the frequency shifted peaks 41, 42 and the central peak 43 if relative optical power of the first and second lights at the input of the optical mixer 130 of the COR under test are known. With a perfect CMRR, all photodiodes of the differential receiver of the COR, all optical and all electrical paths within the COR would have the same properties and therefore all direct detection terms would completely cancel out. In an imperfect COR the direct detection terms do not cancel out and the residual spectral peak 43 at the AM modulation frequency F is visible.

For measuring the CMRR, the optical modulator 110 may be in the form of any suitable optical intensity modulator that is capable of modulating light of a target wavelength with a variable modulation frequency in an operating frequency range of the COR under test, including but not limited to an optical absorption modulator and a Mach-Zehnder modulator (MZM). In an example implementation, the optical modulator 110 is an MZM that is biased at or near a quadrature operating point thereof, i.e., at a voltage where the electro-optical (EO) response T(V) of the modulator is approximately linear; here V denotes voltage applied to a signal input of the modulator, and TO denotes the optical amplitude or power transmission coefficient of the modulator, i.e. the ratio of the optical power or amplitude at the output of the modulator to that at the input. For measuring the CMRR, the SG 125 may be configured to generate a sine-wave electrical signal at the modulation frequency F and to apply that signal to a signal port of the MZM 110. The SG 125 may further be configured to vary the modulation frequency F during measurements under the supervision of the controller 170, with the controller 170 cooperating with the recorder 160 to measure the CMRR as a function of the modulation frequency at the output of COR 150.

In one embodiment the amplitude $V_{mod}$ of the electrical modulation signal generated by the SG 125 may be selected to be sufficiently small, e.g., less than $V\pi/2$, so that the modulating voltage V applied to the modulator stay within the linear portion of the transfer characteristic T(V) in order to avoid the modulation of the light at the output of the MZM 110 to be spread to harmonics nF of the modulation frequency F, such as 2F. Here, $V\pi$ denotes the modulator voltage that results in a 180° optical phase shift in the MZM arms, as conventionally used in the art.

Under the linear modulation condition, the optical power $P_{sig}(t)$ of the first light 106 after the MZM 110 can be approximately described as $$P_{sig}(t) = \langle P_{sig}(t) \rangle \times [1 + m \times \sin(\omega_{mod} t)] \quad (3)$$

where t represents time, m<1 is the modulation index of the optical power at the output of the MZM 110, and $\omega_{mod}=2\pi F$ is the circular modulation frequency. For m<<1, e.g. m≤1/3, the optical field at the output of the MZM may be approximately described by equation (4), where $\omega_{opt}$ is the optical frequency of light passing through the MZM:

$$E_{sig}(t) = \sqrt{\langle P_{sig}(t) \rangle} \times \left[1 + \frac{m}{2} \times \sin(\omega_{mod} t)\right] \times \cos(\omega_{opt} t) \quad (4)$$

In the example embodiment of a substantially single-frequency small-signal amplitude modulation of the test light 106 or 107 at one of the COR optical inputs, the optical power SDD($\omega_{mod}$) in the 'direct detection' spectral line 43 at the modulation frequency F may be estimated as $$SDD(\omega_{mod}) = 2 \times CMRR \times \langle P_{sig}(t) \rangle \times m, \quad (5)$$

where $\omega_{mod}=2\pi F$, and $\langle P_{sig}(t) \rangle \equiv P_{sig}$ is the average power of the modulated test light at the COR input. The optical power $S^{coh}(\omega_{mod} \pm \omega_f)$ in the spectral lines 41, 42 at the shifted modulation frequencies (F±f), $\omega_f = 2\pi f$, which represent coherent detection, may be estimated from equation (6):

$$S(\omega_{mod} \mp \omega_f) = m \times \sqrt{\langle P_{sig}(t) \rangle \times \langle P_{LO}(t) \rangle}. \quad (6)$$

We see that the ratio of signal strengths of the respective modulation components given by equations (5) and (6) is proportional to the CMRR but is independent on the modulation index.

Thus, with a suitably configured apparatus 100 the CMRR may be estimated from comparing the strength of the spectral line at the modulation frequency F to the strength of the coherent detection lines at the shifted modulation frequencies. In a logarithmic scale, e.g., when measured in decibels (dB), the CMRR value is proportional to the difference in the total power of the two shifted peaks and the base modulated peak. Its value is offset by the ratio of the local oscillator power and the signal power. Denoting the power of one shifted peak 41 or 42 as $P_{shift}$, the power of the base modulation peak 43 as $P_F$, the power of the local oscillator (all values in dB) may be computed as follows:

$$CMMR_{dB} = A + P_{shift} - P_F + P_{Sig} - P_{LO}, \quad (7)$$

where 'A' denotes a constant that is equal to 6 dB when the modulator 110 is a Mach-Zehnder modulator (MZM) biased at the quadrature operating point, but may generally depend on the modulator. The difference $P_{sig} - P_{LO}$ between optical powers at the signal and LO inputs of COR 150 is determined by the difference in optical loss from the input of the optical splitter 105 to the output optical ports 111 and 112 of the apparatus, and further to the inputs of the optical mixer 130; it may be determined using an optical power meter or an optical spectrum analyzer (OSA) (not shown), or it may be determined by calibration, such as by pre-measuring the power splitting ratio of the optical splitter 105 and the difference between optical losses in the two optical paths from the beam splitter to the optical ports 111 and 112. It can be also determined by measuring the DC bias currents of the photodetectors 141 of the COR 150.

In one embodiment, the value of the modulation index m may be selected so as to provide a suitably high signal to noise ratio at the recorder 160 while avoiding the appearance of modulation frequency harmonics at the output of the modulator. By way of example, in one embodiment m may be selected in the 0.1-0.3 range. The frequency shift f provided by the optical frequency shifter 109 may be selected to be sufficiently high so as to avoid operating in a regime where the measurement results are dominated by random phase shifts within the measurement setup that may introduce a high level of uncertainty in the measured CMRR values, but not too high, e.g. a few GHz, where the spectral lines at the two shifted modulation frequencies (F+f) and (F−f) may be affected by S21 frequency response variations of the setup, reducing the accuracy of the measured CMRR. By way of example, an optical frequency shift f may be selected in the range from about 1 MHz to about 100 MHz, or preferably in the range of about 10 to about 50 MHz, for example 27 MHz.

Figure 4:
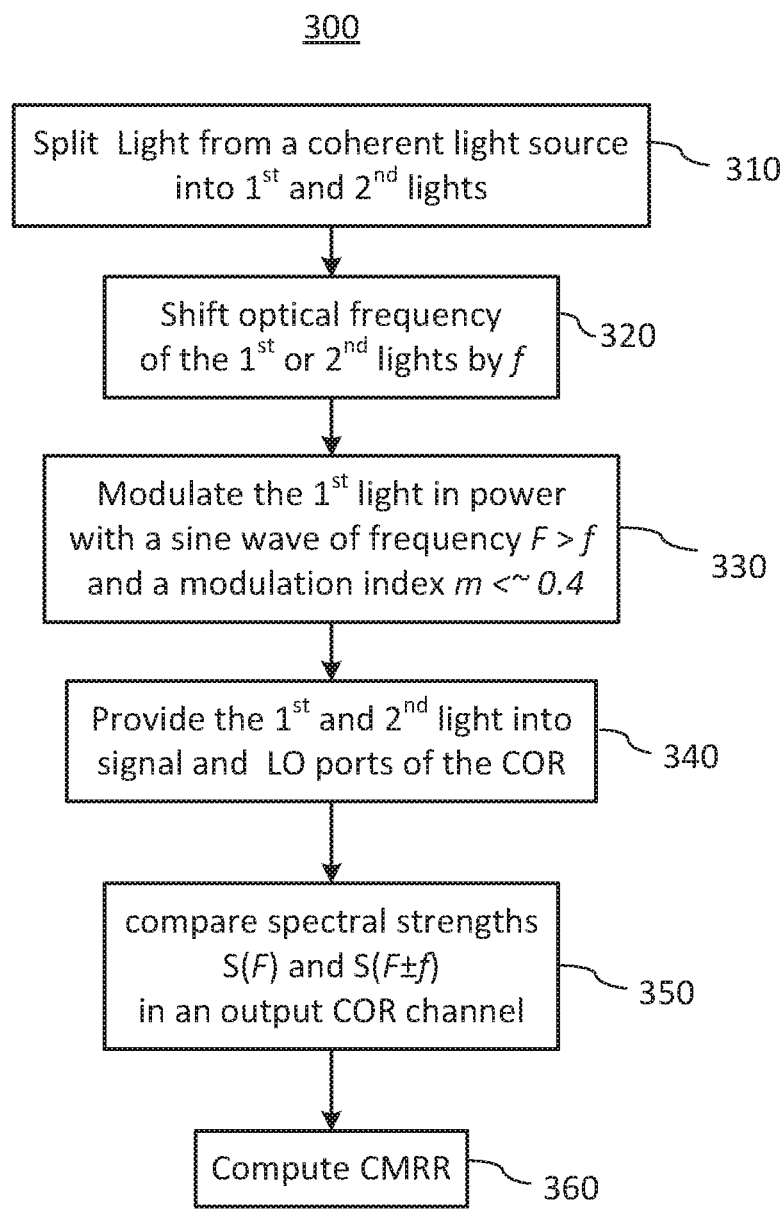
FIG. 4 is a flowchart of an embodiment of the method of FIG. 2 for measuring the CMRR for the COR.

With reference to FIG. 4, example steps of a method 300 for measuring the CMRR of a COR using an embodiment of apparatus 100 may be summarized as follows. Similar to method 200 described hereinabove with reference to FIG. 2, in the illustrated embodiment the method starts with a step or operation 310 of splitting the light 103 from a coherent light source 101 into first and second lights 106, 107 using the optical beam splitter 105. At step or operation 320, the first light 106 or the second light is frequency shifted by the frequency shift f. At step or operation 330, the optical power of either the first or the second light is modulated with a substantially sinusoidal modulation waveform at a modulation frequency F>f, preferably so as to avoid the appearance of higher-order harmonics of the modulation frequency in the modulated light. In one embodiment, the modulation step may be performed using an MZM that is biased at or near the quadrature operating point and is modulated with a single-frequency or narrow-band voltage signal with modulation amplitude less than $V\pi/2$, so as to ensure the operation in a linear modulation regime. The operations 320 and 330 of the optical frequency shifting and modulating can be performed in any order, and on either of the first and second lights. One of the first and second lights is then provided into the local oscillator (LO) input port of the COR 150, and the other of the first and second lights into the signal port of the COR 150, as indicated at 340. At step or operation 350 the recorder 160 may cooperate with the controller 170 to record the output COR signal 144 to detect and compare spectral lines S(F) and S(F±f) at one of the shifted modulation frequencies (F−f) or (F+f) and at the modulation frequency F. In some embodiments the recorder 160 or the controller 170 may be configured, for example programmed, to compute the spectrum of the recorded COR signal 144. In some embodiments the recorder 160 or the controller 170 may be configured, for example programmed, to determine the relative strength of the spectral lines S(F) and S(F±f) by first filtering two copies of the recorded output COR signal with narrow-band filters centered at the shifted modulation frequencies (F−f) or (F+f) and at the modulation frequency F, respectively, and then determining signal intensities of the two filtered signals. At step or operations 360, the controller 170 computes the CMRR for a given modulation frequency F based at least in part on the strength of the spectral component at the modulation frequency F relative to that at the shifted modulation frequency (F±f). The modulation frequency F may be varied during the measurement to obtain the frequency dependence of the COR performance characteristic being measured.

Although FIG. 1 shows a single differential output channel of COR 150 from a single optical mixer 130, in other embodiments, such as those commonly used in coherent optical communications, the optical mixer 130 may be of the type known as 90° optical hybrid which has four output ports that connect to two differential photodetectors, so as to output in-phase (I) and quadrature (Q) signals as known in the art. Furthermore, for polarization diversity such a COR may use two optical hybrids, one for each of two orthogonal polarizations.

Figure 5:
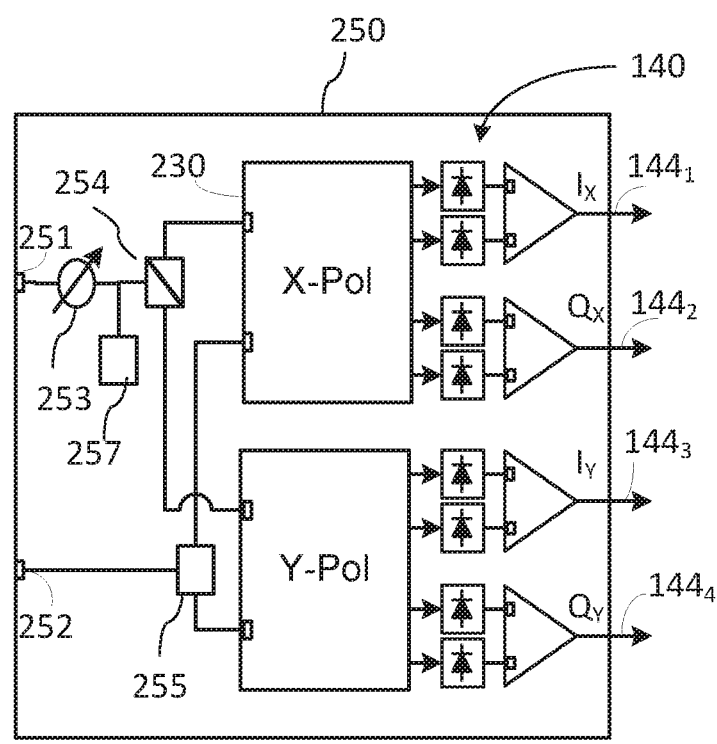
FIG. 5 is a schematic block diagram of an embodiment of a COR including two optical mixers for polarization diversity and four output channels.

Referring now to FIG. 5, there is schematically illustrated a block diagram of an embodiment of COR 150 in the form of a dual-polarization, dual-quadrature integrated coherent receiver (ICR) 250. ICR 250 includes a signal optical port 251 that connects to a polarization beam splitter (PBS) 254, which outputs are connected to one of two input ports of each of two 90° optical hybrids 230. A variable optical attenuator 253 may be connected between the signal input port 251 and the PBS 254, and a monitoring photodetector 237 coupled at the output thereof to monitor the optical signal power provided to the optical hybrids 230. An LO input port 252 connects to a polarization preserving beam splitter (PPS) 255, which outputs are connected to the remaining input ports of the optical hybrids 230. Each of the 90° hybrids 230 have four optical outputs that are pair-wise connected to two differential detectors 140. The two 90° hybrids 230 operate at orthogonal optical polarization components of the input optical signal, and thus provide quadrature I and Q signals in two polarization channels or planes, which are referred to as X- and Y-(polarization) channels or X- and Y-polarization planes of the COR. Thus, ICR 250 has four output channels providing four output electrical signals Ix, Qx, Iy, and Qy that in FIG. 4 are labeled at $144_1$ to $144_4$, respectively. The ICR 250 may be implemented in a single chip, and may be configured to have a receiver bandwidth of more than 10 GHz.

Figure 6:
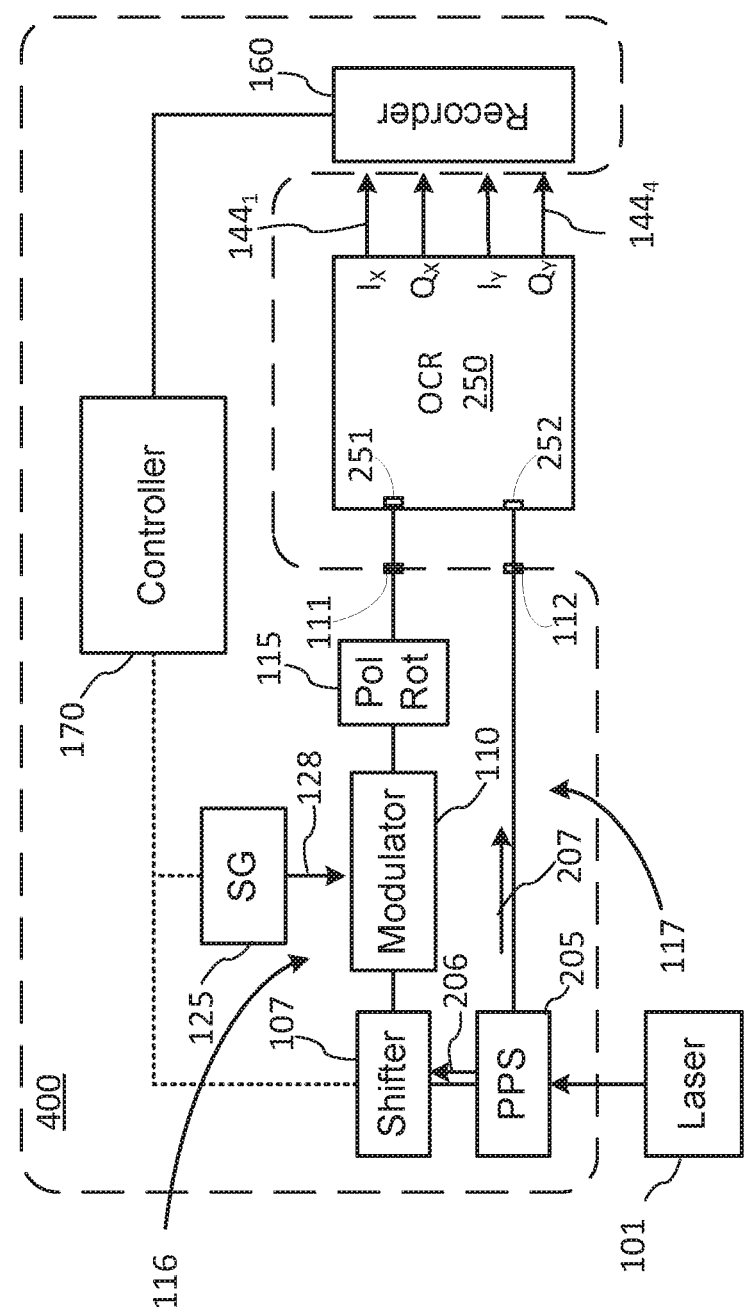
FIG. 6 is a schematic block diagram illustrating an embodiment of the apparatus of FIG. 1 for testing the COR of FIG. 5 in the four output channels.

Referring now to FIG. 6, there is illustrated an embodiment of the test apparatus 100, generally indicated at 400, that is configured for testing multi-channel polarization diversity coherent optical receivers of the type illustrated in FIG. 5. The apparatus 400 includes all of the main components of the apparatus 100, but may additionally include a polarization rotator 115 in the arm of the apparatus that connects to the signal port 251 of OCR 250. A beam splitter 205 splits light from the coherent light source 101 into first and second lights 106, 107 to propagate along two optical paths, or arms, 116 and 117 of the apparatus, which terminate with the first and second output ports 111 and 112. The first output port 111 is configured to connect to the signal port 251 of ICR 250, and the second output optical port 112 is configured to connect to the LO port of ICR 250; accordingly, the first output port 111 may also be referred to as the signal output port of the apparatus 400, and the second output port 112 may also be referred to as the LO output port. The beam splitter 205 may be a polarization preserving beam splitter (PPS) that outputs the first and second lights 106, 107 of substantially the same polarization. The polarization rotator 115 may be configured to rotate the polarization of the received light by a desired angle, for example about 45°, so that the light received at the signal port 251 of ICR 250 is split between the two optical hybrids in desired proportions, and characteristics of the COR may be measured for orthogonal signal light polarizations. It will be appreciated that the angle of the polarization rotation may differ from 45°, for example by as much as +\−15-20°, as long as enough light is sent into both optical hybrids of the ICR 250 to allow for a sufficiently high SNR at the recorder 160 when signals in both polarization planes are measured. Alternatively, the polarization rotator 115 may be configured to be switchable between a first state in which it doesn't change the polarization of the first light 206 and a second state wherein the polarization at the output of the polarization rotator 115 is converted to the respective orthogonal polarization. Characteristic of the COR under test for the two orthogonal polarizations may then be measured, using any of the methods described herein, in two separate measurement steps in which the polarization rotator 115 is set to the two different states s. The optical frequency shifter 107 and the optical modulator 110 in apparatus 400 may be disposed in either of the two optical paths 116, 117.

The apparatus 400 may operate generally as described hereinabove with reference to apparatus 100 of FIG. 1 and the flowcharts of FIGS. 2 and 4 to measure the CMRR in any one of its four output channels Ix, Qx, Iy, and Qy. The recorder 160 in this embodiment may be a single-channel device which input connection may be switched between the output ports of the ICR 250. More preferably, the recorder 160 in this embodiment is a four-channel device with four input electrical ports configured to connect to the four outputs of ICR 250 to simultaneously measure the four outputs signals $144_1$-$144_4$ and to determine therefrom the CMRR for each of the ICR outputs in cooperation with the controller 170. More particularly, in one embodiment the recorder 160 may be configured to record, sequentially or in parallel, a selected duration of each of the four output ICR signals $144_1$-$144_4$, and to determine the strengths of their spectral components at the modulation frequency F and the one or more shifted modulation frequencies (F+f) and (F−f), optionally with the cooperation of the controller 170. The controller 170 may then compute the CMRR for each of the recorded signals by comparing the signal strength at the base modulation frequency F to that of the shifted modulation frequency, as described hereinabove with reference to FIGS. 1-4. The computation of the CMRR may take into account the difference between the optical powers at the inputs of the ICR 250 as also described hereinabove, optionally accounting for the settings of the VOA 253 and/or any other VOA that may be present in the ICR 250.

Figure 7:
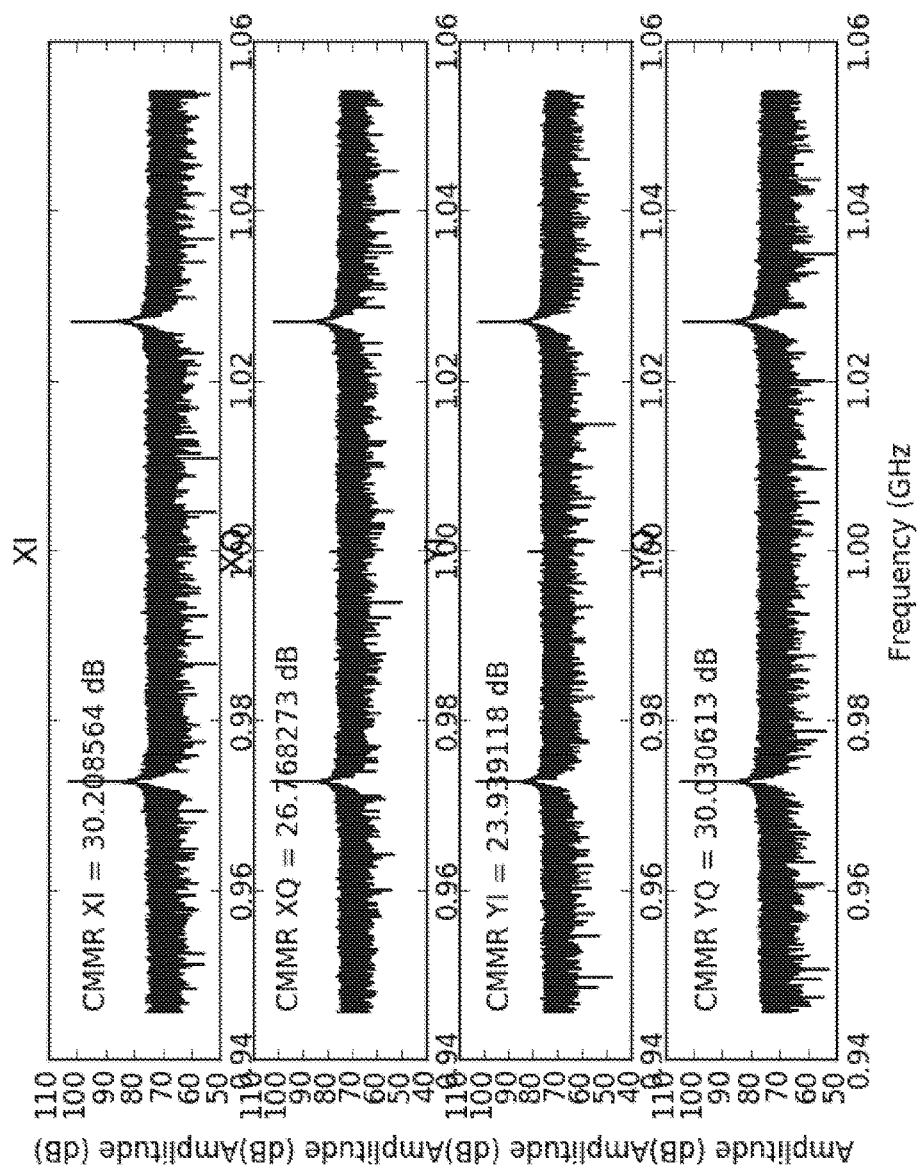
FIG. 7 is a graph illustrating example measured output spectra for a four-channel CMRR measurement.

FIG. 7 illustrates by way of example four spectra obtained using the apparatus 400 from the four output channels of an example OCR of the type illustrated in FIG. 5, with the modulation frequency F of 1 GHz and the optical frequency shift f of 27.12 MHz. The two spectral peaks at the shifted modulation frequencies 0.97288 GHz and 1.02712 GHz are clearly visible, with the DD peak at the base modulation frequency of 1 GHz discernable above the noise level for two of the four channels. The CMRR values computed for each of the channels using equation (7) are indicated in the figures.

Figure 10:
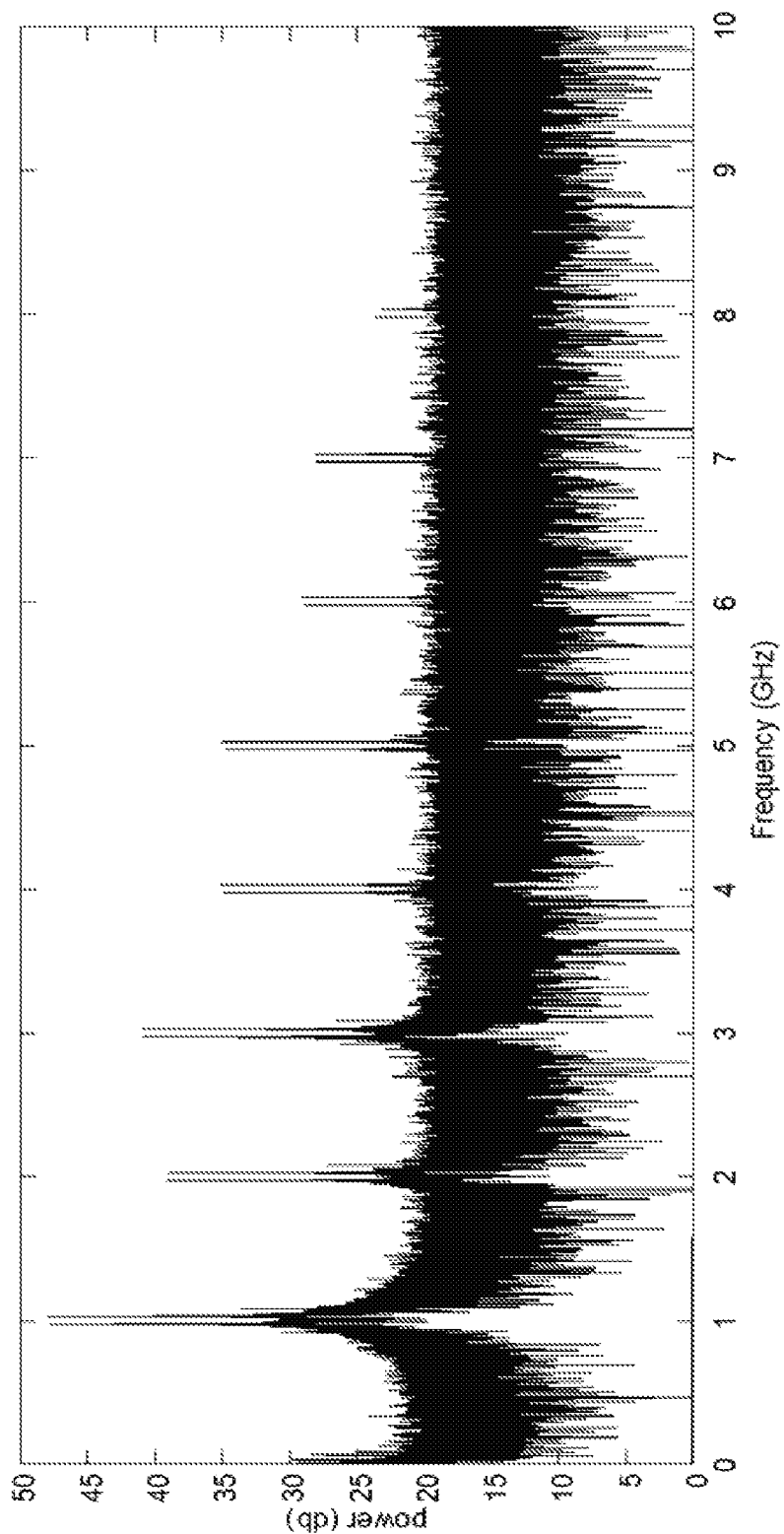
FIG. 10 is a graph illustrating an example measured output spectrum for a multi frequency test signal.

Although in the example embodiments described hereinabove the optical modulator 110 is configured to modulate the light intensity at a substantially single frequency F, in other embodiments the light sent to the COR under test may be modulated in amplitude at a plurality of frequencies. For example, the optical modulator 110 may operate in a non-linear regime, resulting in the presence of one or more harmonics of the modulation frequency F in the AM modulation of the test light that is sent by the apparatus 100 or 400 into one of the input ports of the COR. This may happen, for example, for a sufficiently high amplitude of the electrical modulation signal at the MZM and/or when the MZM is biased away from the quadrature point. In another embodiment, the modulator 110 may be modulated with, for example, a square wave which spectrum includes a plurality of harmonics of the base modulation frequency. In such embodiments, a number of modulation sub-bands may appear in the COR output signal, each containing a harmonic nF of the modulation frequency F shifted by ±f, and possibly a direct detection peak at the modulation harmonic nF, as illustrated in FIG. 10 showing multiple modulation sub-bands centered at multiples of 1 GHz. The CMRR may be computed in such embodiments for all those sidebands following the approach described hereinabove for the single sideband case, taking into account the distribution of optical power among the sidebands.

Figure 8:
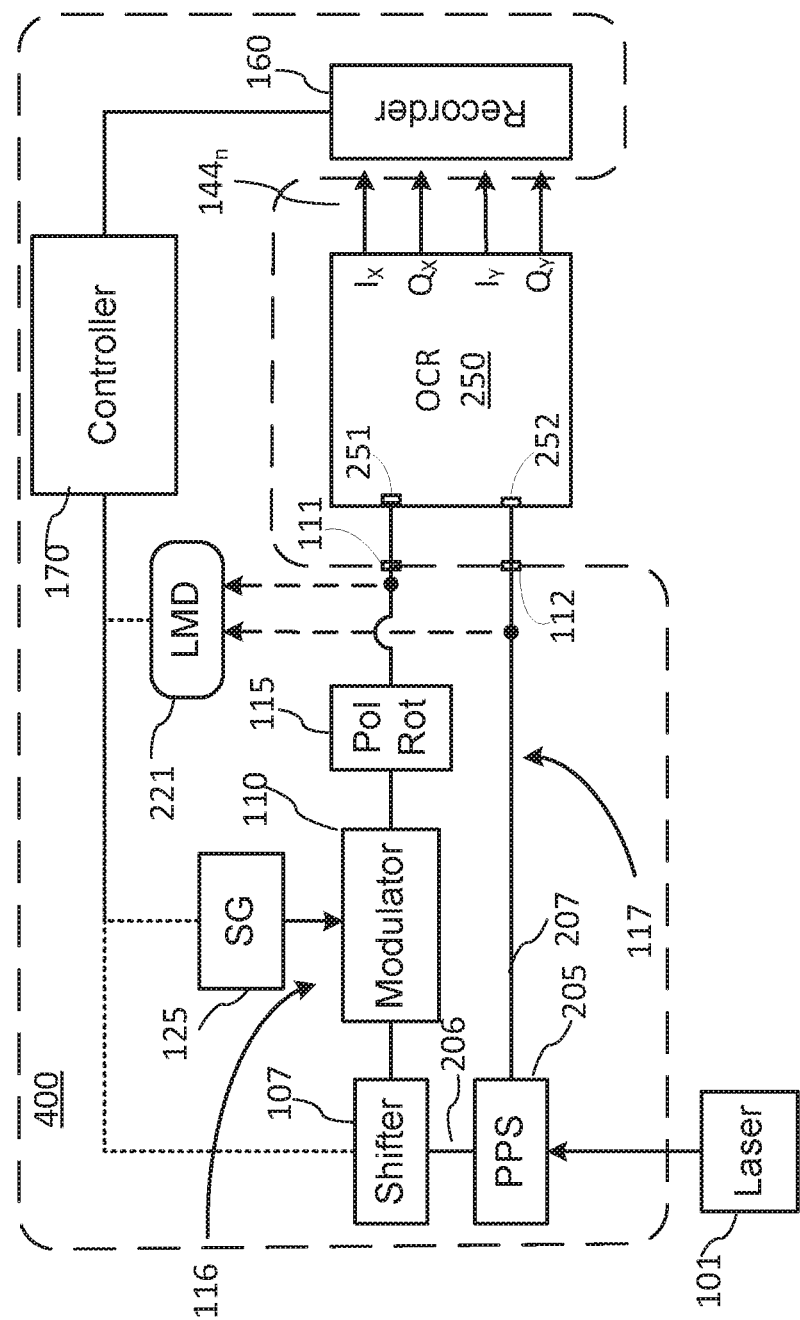
FIG. 8 is a schematic block diagram illustrating an embodiment of the apparatus of FIG. 6 using a light measuring device to characterize light provided to the COR input(s) during measurements.

Referring to FIG. 8, there is illustrated an embodiment of the apparatus 400 that additionally includes a light measuring device (LMD) 221, such as an OSA or an optical power meter, but may be otherwise substantially as described hereinabove with reference to FIGS. 1 and 6. As illustrated, LMD 221 is optically coupled, for example using optical taps, to the two optical paths of the apparatus to measure light provide by the apparatus 400 to the optical inputs of the ICR 250 under test.

In an embodiment wherein the optical spectrum of the first light 206 at the output of the modulator 110 contains spectral lines at one or more harmonics of the modulation frequency F, the LMD 221 may be in the form of an OSA that is configured to measure relative strengths of these spectral lines at the modulation frequency F and its harmonics n·F, n=1, 2, 3 . . . , and to communicate this distribution to the controller 170 for computing the CMRR values at respective frequencies.

In an embodiment wherein the optical modulation of the first light 206 at the output of the modulator 110 contains substantially only the modulation frequency F, the LMD 221 may be an optical power meter that is configured to measure an optical power ratio $P_{sig}/P_{LO}$ at the signal and LO inputs of the ICR 250 under test. For example, it may include a single photodetector coupled to an optical switch to separately test the optical powers at the output ports 111, 112 of the apparatus 400 in cooperation with the controller 170, or it may include two photodetectors separately coupled to optical taps disposed in the optical paths of the first and second lights at the output ports 111, 112. The optical powers $P_{sig}$ and $P_{LO}$ measured by the OMD 221 may be provided to the controller 170, which may be programmed to use them when computing the CMRR as described hereinabove, for example with respect to equation (7). In embodiments of COR 150 or 250 that includes one or more optical components between the signal and LO ports and the optical mixers, such as for example VOA 253 shown in FIG. 5, the additional attenuations provided by the VOA(s) and/or other internal optical components of the COR may be taken into account when computing the CMRR.

It will be appreciated that the apparatus 100 or 400 may be physically implemented in a variety of ways, including using balk optics and or optical fibers to embody the optical paths 116 and 117 and to connect various optical elements to each other and to the input optical ports of the COR under test as illustrated in FIGS. 1, 6, and 8. The electrical signal recorder 160 may be embodied for example using a high speed real time oscilloscope, such as a sampling oscilloscope, or an electrical spectrum analyzer. In embodiments configured for testing CORs having four output electrical channels for the Ix, Qx, Iy, and Qy signals, as described hereinabove with reference to FIGS. 5, 6, and 8, a four-channel sampling oscilloscope may be used. In embodiments wherein the recorder 160 is configured to output time-domain traces of the received output COR signals 144, the controller 170 may be configured, for example programmed, to perform spectral analysis of those traces to determine the strength of the spectral component thereof at the base modulation frequency relative to that at the shifted modulation frequency or frequencies.

Figure 9:
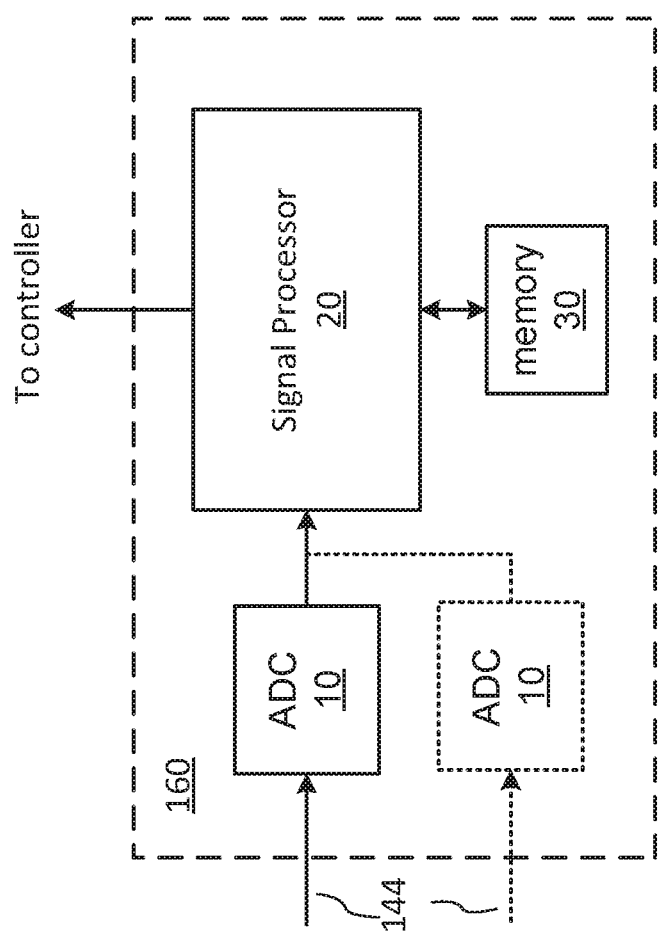
FIG. 9 is a schematic block diagram of an embodiment of the electrical signal recorder for use in the apparatus of FIG. 1, 6, or 8.

With reference to FIG. 9, in one embodiment the recorder 160 may be implemented using one or more analog-to-digital converters (ADC) 10 at its input, which is/are operatively followed by a processor 20, which is in turn coupled to a memory device 30. The processor 20 may be implemented, for example, using a digital signal processor, a suitable high-speed microcontroller, an FPGA, or an ASIC. The processor 20 may be configured to save sampled time-domain signal or signals received from the COR under test in memory 30. The sampling rate of the ADC 10 should be more than twice the modulation frequency F. The duration of the saved signal may be chosen to be sufficiently large to provide a desired signal to noise ratio, for example a few million sampling points. Although implementing the controller 160 using digital logic circuits and/or processors may be preferable, it will be appreciated that an analog implementation or a combination of analogue and digital circuitry is also possible and would also be within the confines of the present disclosure.

The sampled time-domain trace of the COR output signal 144 may then be passed to the controller 170 for computing the CMRR. The controller 170 may be embodied using a suitable computing device, such as but not exclusively a general purpose digital processor or a suitable microcontroller, which may include interfaces for communicating with and/or controlling the SG 125 and optionally other elements of the setup, such as the OFS 107 and a bias control circuit of the optical modulator 110 (not shown in FIGS. 1, 5 and 8). By way of example, the controller 170 may be in the form of a computer.

The controller 170 may be programmed to receive the sampled time-domain traces from the recorder 160, for example by reading the content of memory 30, either directly or with the aid of processor 20, and to compute a spectrum $S(\omega)$ thereof, where $\omega$ represents frequency. The controller 170 may further be programmed to determine, from the computed spectrum, the strength $P_F=S(2\pi F)$ of the direct detection component of the spectrum at the base modulation frequency relative to the spectral strength $P_{shift}$ of the modulation component or components at the shifted modulation frequency, $P_{shift}=S(2\pi(F\pm f))$, and compute the CMRR based on the determined relative spectral strengths as described hereinabove.

In one embodiment, the controller 170 may be configured to vary, for example to increment, the base modulation frequency F across a specified frequency range, for example a frequency range covering the receiver bandwidth of the COR under test, and to determine the CMRR value and/or values of other COR performance parameters as described herein for one or more output channels of the COR for a plurality of values of the base modulation frequency F that spans the specified modulation frequency range.

Advantageously, the general setup of the apparatuses 100 of FIG. 1 or apparatuses 400 of FIGS. 6 and 8 enables measuring not only the CMRR, but other relevant performance parameters of a COR, such as for example the phase response $\Phi(\omega)$ of the COR under test and the group delay variation (GDV). The GDV is a measure of how the group delay (GD) $\tau_g$, $$\tau_g = \frac{d\Phi(\omega)}{d\omega}, \tag{8}$$

that occurs in a device, such as a COR, varies with the RF frequency $\omega$ of the received signal.

The phase response $\Phi(\omega)$, the frequency dependence of the GD $\tau_g(\omega)$, and the GDV of a COR under test may be measured using an embodiment of the apparatus 100 or 400 wherein the modulator 110 is configured to modulate the amplitude, and therefore the intensity and optical power, of the first light 106 simultaneously at the first modulation frequency $F=F_1>f$ and a second modulation frequency $F_2$ that is greater than $F_1$, and the recorder 160 is configured to simultaneously record time traces $S_1(t)$ and $S_2(t)$ of two spectral components of the output COR signal 144 at the shifted modulation frequencies $F_1s=(F_1\pm f)$ and $F_2s=(F_2\pm f)$. The controller 170 may be programmed to compute the GD from a phase difference $\Delta\Phi$ between the recorded traces $S_1(t)$ and $S_2(t)$, for example by dividing $\Delta\Phi$ by a frequency difference $\Delta\omega = 2\pi\Delta F = 2\pi(F_2-F_1)$.

Figure 11:
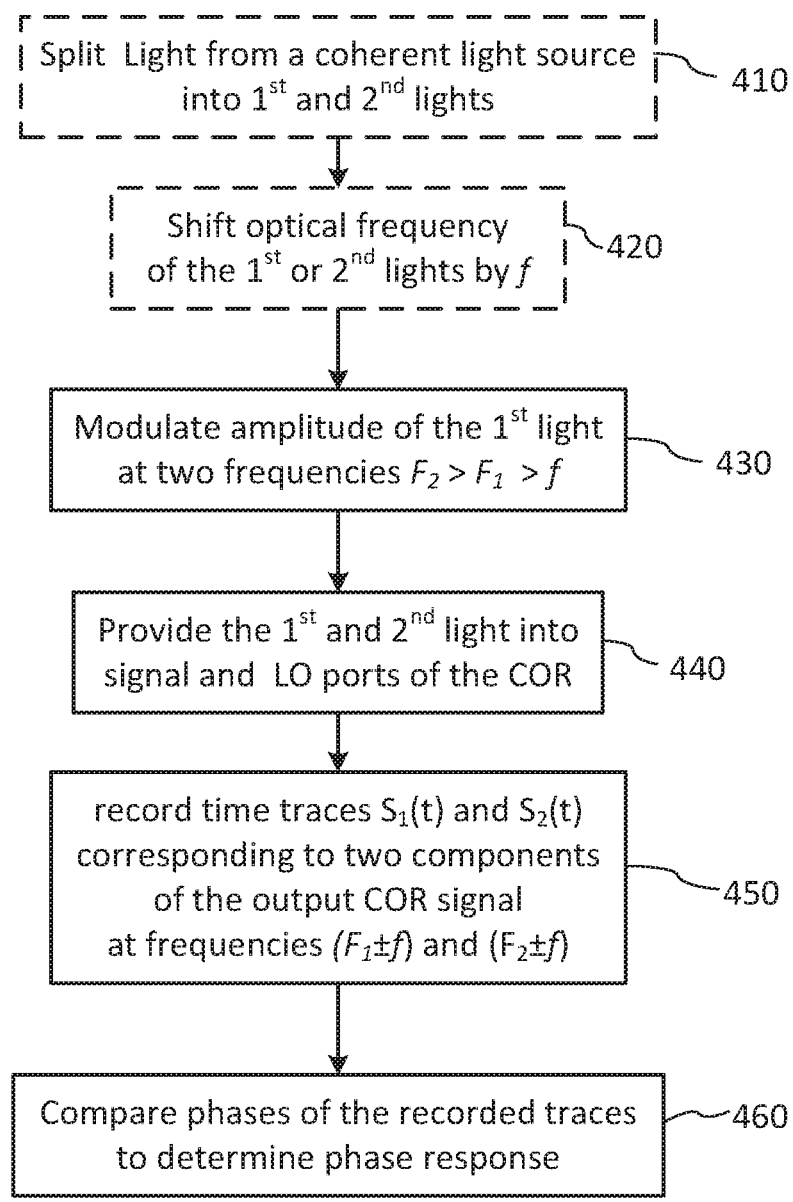
FIG. 11 is a flowchart illustrating example steps of a method for determining the group delay variation (GDV) of a COR.

With reference to FIG. 11, there is illustrated a flowchart of a method 500 for measuring a phase response and the GDV of COR 150 or 250. The method 500 may be viewed as an embodiment of method 200 and may be implemented with the apparatus 100 of 400 that is configured as described hereinabove. In the illustrated embodiment, the method starts with a step or operation 410 of splitting the light 103 from a coherent light source 101 into first and second lights 106, 107 using the optical beam splitter 105. At step or operation 420, the first light 106 or the second light is frequency shifted by the frequency shift f. In embodiments wherein the $1^{st}$ and $2^{nd}$ light are produced from two different coherent optical sources and differ in optical frequency by the optical frequency shift f, steps 210 and 220 may be omitted. At step or operation 430, either the first or the second light is modulated in amplitude at two phase-locked modulation frequencies, the first modulation frequency $F = F_1$ and a second modulation frequency $F_2$, wherein $F_2 > F_1 > f$, using a suitable optical modulator such as the optical modulator 110. The operations of the optical frequency shifting and modulating can be performed in any order, and on either of the first and second lights. One of the first and second lights is then provided into a local oscillator (LO) input port of the COR 150, and the other of the first and second lights into the signal port of the COR 150, as indicated at 440.

The light modulation operation at 430 is performed preferably in a phase-locked manner so that the optical power of the first light 106 at the output of the modulator 110 is modulated with two sinusoidal signals at the first and second frequencies $F_1 = \omega_1/2\pi$ and $F_2 = \omega_2/2\pi$ that may vary in time in proportion to $\sin(\omega_1 \cdot t + \phi_1)$ and $\sin(\omega_2 \cdot t + \phi_2)$, respectively, with a phase shift $\Delta\phi = (\phi_1 - \phi_2)$ therebetween that does not change substantially over a time period of the measurement. The optical signal generated at the output of the modulator 110 may be referred to as a phase-locked multi-carrier optical test signal.

At step or operation 450 the recorder 160 detects the output COR signal 144 from the differential detector 140 that appears at an output port of the COR under test 150 or 250 in response to launching the first and second lights into its input optical ports. At this step the recorder 160 may sample and record a duration T of the received COR signal, or at least one or more frequency components thereof. The duration T of the recorded signal S(t) is preferably selected so as to provide a desired signal to noise ratio when determining phases of recorded time-domain traces, for example so as to include many thousands of modulation periods $1/F_1$.

The output COR signal 144 received by the recorder 160 may be filtered to obtain a first time-domain trace $S_1(t)$ corresponding to a first frequency component which represents the modulation of the COR signal 144 at a shifted first modulation frequency $(F_1-f)$ or $(F_1+f)$, and a second time-domain trace $S_2(t)$ corresponding to a second frequency component which in this embodiment represents the modulation of the COR signal 144 at the second shifted modulation frequency $(F_2-f)$ or $(F_2+f)$. The time domain trace $S_1(t)$ may be referred to herein as the first time domain trace, and the time domain trace $S_2(t)$ may be referred to as the second time domain trace. Each of these traces may be obtained, for example, by applying a suitably narrow-band digital or analog filter to the recorded COR output signal 144, or to a signal obtain therefrom by a pre-processing operation. In one example embodiment, the recorder 160 is a digital signal recorder having at least one ADC 10 followed by the digital processor 20 at its input as illustrated in FIG. 9, wherein the processor 20 may be configured to perform the filtering operations using digital filters that may be implemented with software or hardware logic as known in the art. It will be appreciated that tunable analog RF filters may also be used to select the desired frequency components.

For example, in one embodiment one of the filters may be centered at one of the first shifted modulation frequencies $F_{11} = (F_1-f)$ or $F_{12} = (F_1+f)$, e.g. $F_{11}$, and the other filter may be centered at one of the second shifted modulation frequencies $F_{21} = (F_2-f)$ or $F_{22} = (F_2+f)$, e.g., $F_{21}$. In one embodiment, a frequency shifting operation may be applied to either the COR signal 144 received by the recorder 160 or to at least one frequency component thereof, and one or both of the center frequencies of the filters may also be correspondingly shifted.

At step or operations 460, the first and second time-domain traces may be compared to determine a phase difference $\Delta\Phi$ therebetween. The GD $\tau_g$ may then be computed, for example by dividing the measured phase difference $\Delta\Phi$ by the difference $\Delta F$ in the frequencies of the first and second time-domain traces. These steps may be performed, for example, by the controller 170 in cooperation with the recorder 160. The controller 170 may be further programmed to vary the first and second modulation frequencies $F_1$ and $F_2$ in a desired wavelength range, for example across the operating frequency band of the COR 150 as may be specified for a particular COR under test, so as to determine the GD at a plurality of frequencies, and to determine the GDV. In one embodiment, the GDV may be saved and/or presented to a user in the form of a function representing the measured dependence of the GD on frequency, or as a range ($GD_{min}$, $GD_{max}$), or in any other suitable form. In one embodiment, the GDV may be computed as an estimate of the first derivative of the measured GD(F) dependence with respect to the frequency F or $2\pi F$.

The phase-locked multi frequency modulation at step 430 may be performed so that the second frequency $F_2$ is a harmonic of the first frequency $F_1$, which may be referred to as the base modulation frequency or simply as the base frequency. This may include for example modulating the modulator 110 with an electrical modulation signal 128 that includes phased-locked harmonics of the base frequency $F_1$. The electrical modulating signal 128 may be for example a periodic signal with period $2\pi/F_1$ and a non-sinusoidal waveform, for example a square-wave signal. However, knowledge of the EO phase transfer characteristic of the modulator 110 may then be required at the controller 170 to estimate the GDV.

In a currently more preferred embodiment, the phase-locked multi frequency modulation at step 430 may be performed by applying a substantially single-frequency electrical modulation signal 128 at the base frequency $F_1$ to an embodiment of the modulator 110 that has a substantially non-linear EO modulation transfer characteristic, so as to cause the optical power of the first light 106 at the output of the modulator 110 to be modulated not only at the base modulating frequency $F_1$ but also at one or more harmonics thereof $n \cdot F_1$, $n = 2, 3, \ldots$, using one of the harmonics as the second modulation frequency $F_2$. In one embodiment, the phase-locked multi-frequency modulation operation 430 may include using a suitably biased MZM and modulating it with the sinusoidal electrical modulation signal of the base frequency $F_1$ with an amplitude sufficient to modulate the first light 106 simultaneously at the first modulating frequency $F_1$ and the second harmonic thereof $F_2=2 \cdot F_1$. Advantageously, this embodiment does not require any knowledge of the EO phase transfer characteristic of the modulator 110.

Figure 12:
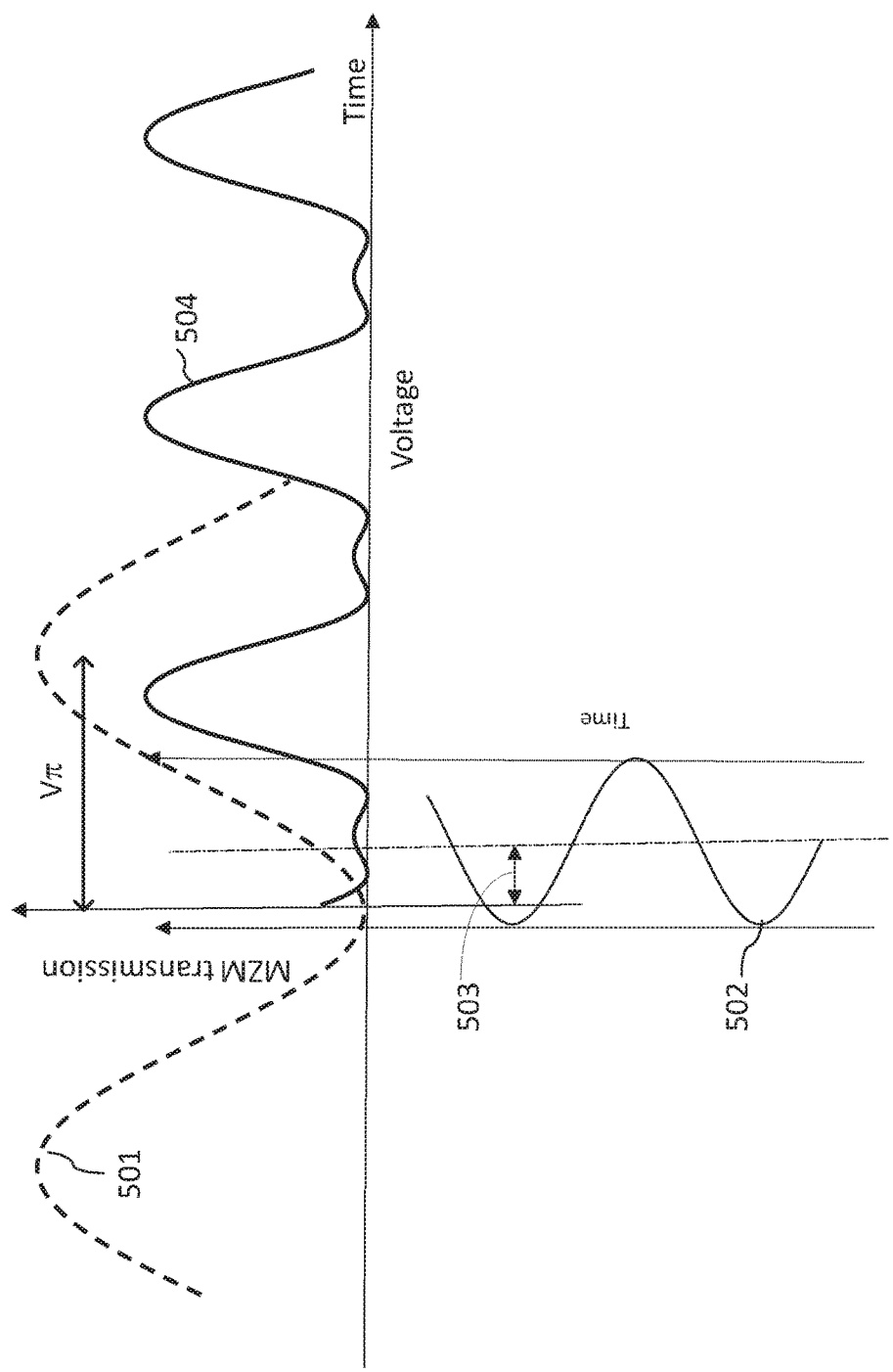
FIG. 12 is a schematic diagram illustrating MZM modulation with a sinusoidal electrical signal for optical harmonic generation.

Referring to FIG. 12, a dashed curve 501 schematically shows an example EO transfer characteristic T(V) of an MZM 110 as a function of an applied voltage V. If the MZM is biased at any of the extremes of the transmission function 501, a small-signal sinusoidal modulation of the MZM at frequency F, i.e., a modulation with an amplitude V<<V$\pi$/2, would result in a modulation of the output light intensity at the second harmonic 2F of the modulation frequency F. If the MZM is biased at a quadrature point, i.e. mid-way between two extremes of the transmission function wherein the function T(V) is approximately linear, a small-signal sinusoidal modulation of the MZM at frequency F would result in a modulation of the output light intensity at the modulation frequency F. The appearance of both the modulation frequency $F_1$ and its harmonic $2F_1$ that is phase-locked to the first frequency $F_1$ in the optical power of the first light 106 at the output of the MZM 110 may be affected by modulating the MZM with a sinusoidal voltage signal with an amplitude greater than V$\pi$/2, and/or biasing the MZM with a suitable bias offset. An example of such modulation is illustrated in FIG. 12 with a curve 502 representing the sinusoidal modulation signal with a bias offset 503 from the point of minimum transmission. The resulting optical intensity of the first light at the output of the modulator is represented by the curve 504, where the presence of phase-locked oscillations at the first modulation frequency $F_1$ and its harmonic $2 \cdot F_1$ is evident. By way of example, in one embodiment the MZM 110 may be biased at roughly half the bias voltage corresponding to the quadrature operating point. In another embodiment, the MZM may be biased closer to the point of minimum transmission thereby allowing for a smaller amplitude of the voltage modulation, which in that case may be smaller than V$\pi$/2, while still resulting in the multi-frequency amplitude modulation of the output light. Selecting the amplitude of the sinusoidal voltage modulation 502 and the bias voltage offset of the MZM 503 so that the first and second harmonics $F_1$ and $F_2$ have approximately equal power in the optical output of the MZM may be beneficial for achieving a good SNR when determining the relative phases of the two traces $S_1(t)$ and $S_2(t)$ at step 460, but is not a requirement.

Figure 13:
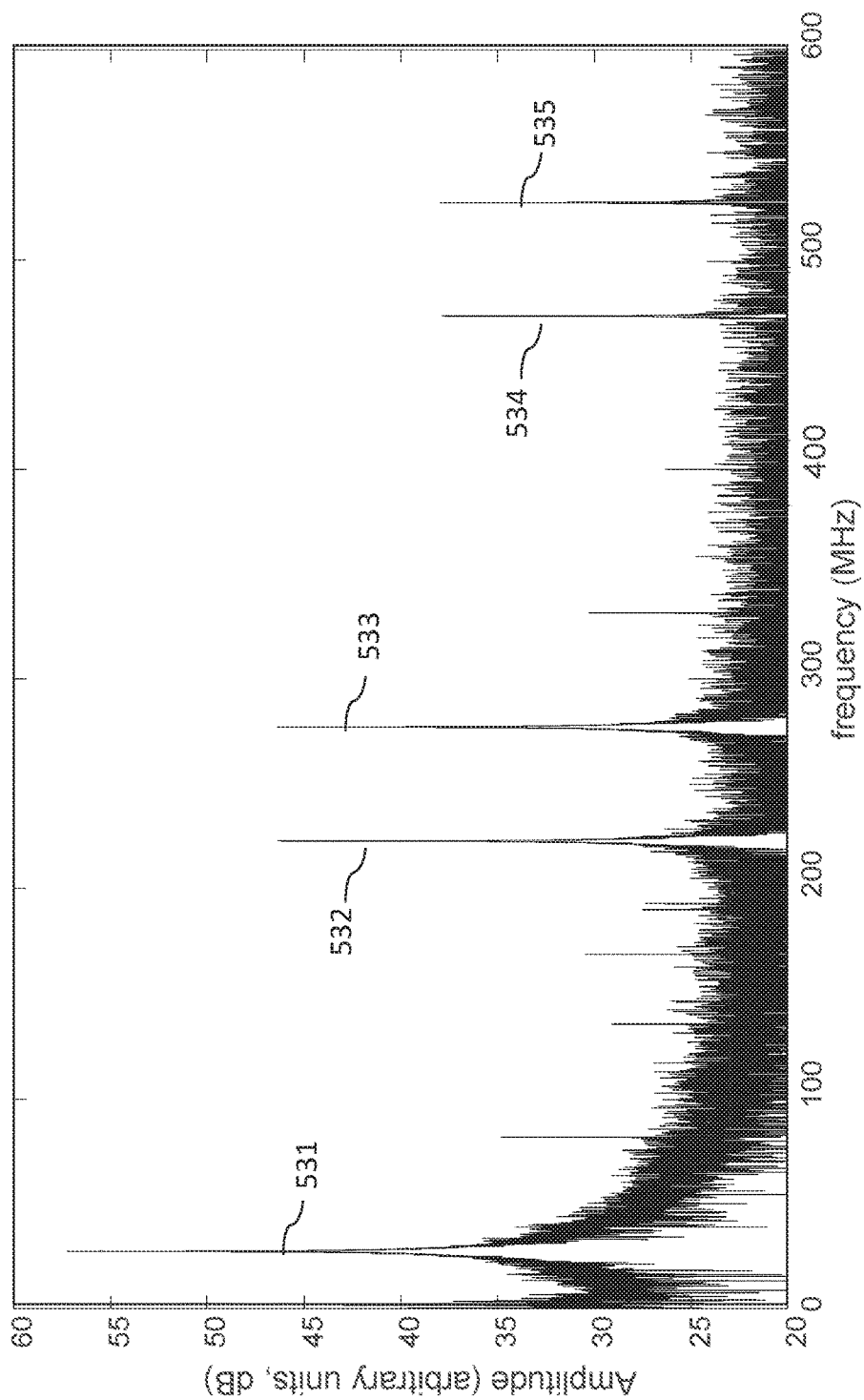
FIG. 13 is a graph of an example measured spectrum of an output electrical signal of the COR when tested using the apparatus of FIG. 1 the optical frequency shift f=27.12 MHz and a multi-carrier modulation with the base modulation frequency F1 of 250 MHz and MZM-generated second harmonic at 500 MHz.
Figure 14:
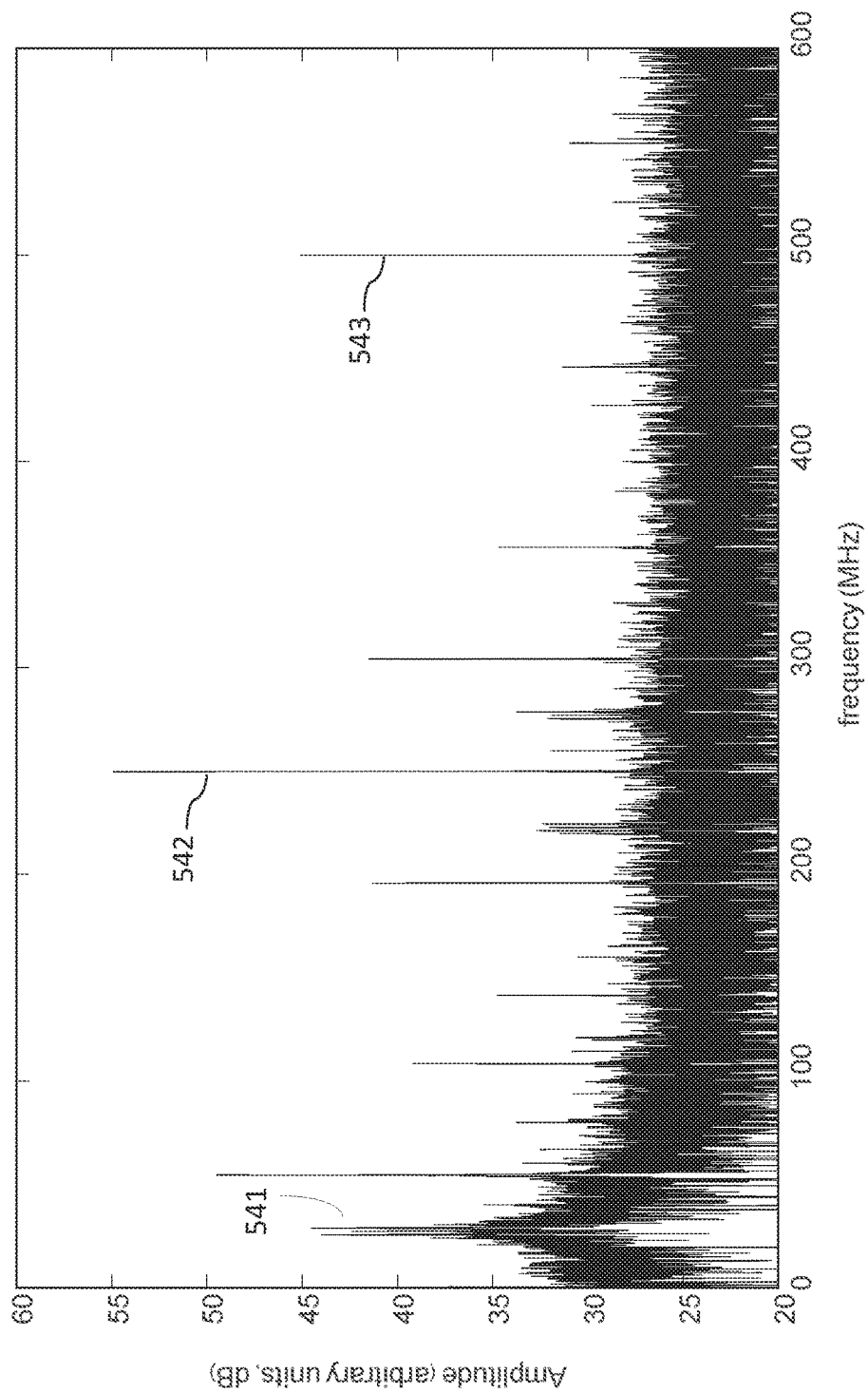
FIG. 14 is a graph illustrating the spectrum of a signal produced by summing squares of the I and Q outputs of the COR under test.

FIG. 13 illustrates by way of example the spectrum of the output COR signal 144 as may be received by the recorder 160 for the optical frequency shift f=27.12 MHz and the base modulation frequency $F_1$=250 MHz. Due to the optical frequency shift in one arm of the setup, the COR under test is operated under heterodyne conditions with a fixed intermediate frequency f, i.e., 27.12 MHz in this example. Due to the optical frequency shift in the test apparatus 100 and the heterodyne detection in the COR, the modulated lines at 250 MHz for the base frequency and at 500 MHz for the second harmonic are shifted each by +/−27.12 MHz resulting in peaks 532 and 533 at (250±27.12) MHz for the first shifted modulation components, and peaks 534 and 535 at (500±27.12) MHz for the second shifted modulation components. A line 531 at the optical shift frequency f=27.12 MHz is also clearly visible.

Referring back to the flowchart of FIG. 11, it will be appreciated that the determination of the phase offset $\Delta\Phi$ between the first and second time-domain traces $S_1(t)$ and $S_2(t)$ may be performed in a variety of ways, all of which would be within the scope of the present disclosure. For example, it may include determining relative timings of the minima or zeros in the recorded traces. A complication with this approach is that neither of the two second shifted frequencies $F_{2\pm}=(F_2\pm f)$ is a harmonic of one of the two first shifted modulation frequencies $F_{1\pm}=(F_1\pm f)$ even when the second modulation frequency is a harmonic of the first modulation frequency, i.e., $F_2=2F_1$. Accordingly, in one embodiment step 450 may include shifting one of the recorded COR signal S(t), the first time-domain trace $S_1(t)$, and the second time-domain trace $S_2(t)$ in frequency so that, after this frequency shifting operation, the second trace becomes a harmonic of the first trace. For example, the recorded COR signal S(t) may be shifted in frequency by the frequency shift equal in value to the optical frequency shift f imposed by the optical shifter 109. This frequency shift operation may be performed, for example, in a digital domain by computing $$S_{shift}(t)=\exp(i2\pi ft)S(t)$$

This operation transforms one of the first shifted modulation frequencies $(F_1 \pm f)$ back to the first modulation frequency $F_1$, and one of the two shifted second modulation frequencies $(2F_1 \pm j)$ to its second harmonic $F_2=2F_1$. Next, two band-pass filters with linear group delay centered at the first modulation frequency $F_1$ and its harmonic $2F_1$, respectively, such as for example Gaussian filters, may be applied to the shifted received signal $S_{shift}(t)$ to obtain the first and second time-domain traces $S_1(t)$ and $S_2(t)$, which are now in the form of sinusoidal oscillations at the modulation frequency $F_1$ and its harmonic $2F_1$. The relative phase between these two time-domain traces may then be determined using any suitable method, as will become apparent to those skilled in the art.

In one example embodiment the phase offset $\Delta\Phi$ between the first and second time-domain traces may be determined by evaluating the time between the zero crossings of the two sine waves representing the traces $S_1(t)$ and $S_2(t)$. For example, the controller 170 may be programmed to detect the time difference between the positive slope zero crossings of the trace $S_1(t)$ at the base modulation frequency $F_1$ and the positive slope zero crossings of $S_2(t)$ at the first harmonic of the base frequency $F_1$. The relative phase $\Delta\Phi$ may then be computed from the known base frequency $F_1$. In order to get a good SNR (signal to noise ratio), the comparison may be performed for thousands of zero crossings, and preferably over a longer signal, for example including hundreds of thousands of the base modulation periods.

Further by way of example, $\Delta\Phi$ may be also determined by squaring the first time-domain trace $S_1(t)$, i.e., performing the operation $S_1(t) \to S_1^2(t)$, thus doubling its frequency, and then shifting the squared trace $S_1^2(t)$ against the second harmonic trace $S^2(t)$ while computing theirs correlation function until the best correlation is reached.

In another example, $\Delta\Phi$ may be also determined by first passing both traces $S_1$ and $S_2$ through a logical circuit, or a software routine, implementing the signum function. The output of the signum function is a square wave switching between plus one and minus one, depending of the sign of the respective trace. Applying the XOR operation to the two outputs of the signum function and calculating the mean value of the result gives information about the relative phase $\Delta\Phi$ between the first and second time domain traces. Those skilled in the art will be able to devise other ways to determine the relative phase of the two harmonic waves $S_1$ and $S_2$ having the benefit of the present description.

Thus in one embodiment method 500 may include modulating a suitably biased MZM with a sinusoidal electrical modulating signal of a base frequency $F_1$ so as to affect an intensity modulation of the first test light 106 at the base frequency $F_1$ and the second harmonic thereof $2F_1$, and determining the GD of the COR under test from the output COR signal by comparing two time-domain traces thereof as described hereinabove. These operations may be repeated for a plurality of base frequency values to obtain information about the GDV.

The value of the optical frequency shift f for measuring the GDV may be determined from considerations similar to those described hereinabove in relation to measuring the CMRR; furthermore, it may be preferred to select f so that the GDV over the frequency span of width f is relatively small. By way of example, it may be in the range from a few MHz to tens of MHz, for example in the 10-50 MHz range. In embodiments wherein a second laser is used to produce the frequency-shifted light, the phase noise of the two lasers may result to inaccuracies in GDV measurements; using frequency-stabilized lasers with spectral linewidth much smaller than f may facilitate more accurate GDV measurements.

In embodiments wherein the COR under test has multiple output channels, such as the ICR 250 described hereinabove with reference to FIG. 5, method 500 may be applied to each of the output channel of the COR under test, for example using an embodiment of the apparatus 400 illustrated in FIG. 6 or 8 wherein the recorder 160 and the controller 170 are configured to perform steps 450 and 460 of the method described hereinabove with reference to FIG. 11. By using the polarization-maintaining beam splitter 205 in combination with the polarization rotator 115, both polarization planes of the ICR 250 receive a signal and can be sampled simultaneously using a suitably configured recorder 160. For example, the recorder 160 may be configured to have four input channels for receiving the four COR signals $144_1$-$144_4$, and to independently process each of these signals, either sequentially in time or in parallel, as described hereinabove with respect to the output COR signal 144, to obtain GDV information for the four output COR channels Ix, Qx, Iy, and Qy. In another embodiment, an RF signal switch (not shown) may be used in front of the recorder 160 to sequentially test the output channels of the ICR 250.

The apparatus 400 of FIG. 6 or 8 with the recorder 160 having four input channels may also be configured to determine an IQ skew parameter and polarization skew parameter of the COR under test. The IQ skew relates to a phase offset between the I and Q COR output signals of the same polarization plane, i.e., a phase offset $\Delta\Phi_{IQx}$ between the Ix output signal $144_1$ and the Qx output signal $144_2$, or a phase offset $\Delta\Phi_{IQy}$ between the Iy output signal $144_3$ and the Qy output signal $144_4$. These phase offsets may be determined by configuring the recorder 160 and/or the controller 170 to simultaneously record the I and Q signals of the same polarization plane from the COR under test, to filter the recorded signals to obtain time-domain traces $S_I(t)$ and $S_Q(t)$ of a same frequency component $F_w$ thereof, and to compare these traces to determine a relative phase shift therebetween $\Delta\Phi_{IQ}$. The frequency component $F_w$ may correspond to any one of the four shifted modulation frequencies $(F_1 \pm f)$ and $(F_2 \pm f)$ corresponding to peaks 532-535 in FIG. 13.

By design, oscillations at any intermediate frequency in the 'I' and 'Q' output quadrature signals in each polarization plane of a COR should have a relative phase shift of 90°; here the intermediate frequency is understood as one of the frequency components in the I and Q output quadrature signals $144_1$, including the optical frequency shift fin one of the arms of the apparatus 100 or 400, or the shifted modulation frequencies $(F \pm f)$. However, this phase shift in a non-ideal COR may slightly differ from 90°, indicating an internal I-Q phase disbalance in the COR and a skew, i.e. a time delay, in the signal travel time for the I or the Q signal, such as for example due to different cable lengths. In one embodiment the controller 170 and/or the recorder 160 may be configured to implement a method to determine the I-Q phase disbalance and the IQ skew in a COR under test by performing the following operations. First, the IQ phase shift MN may be measured for a plurality of different modulation frequencies F. The measured dependence $\Delta\Phi_{IQ}(F)$ may then be linearly extrapolated to a zero modulation frequency F, i.e. to F=0. The resulting extrapolated value $\Delta\Phi_{IQ}(0)$ may be provided to the user as an estimate of the internal I-Q phase shift of the COR, which should be equal to 90° in an ideal COR. Its deviation from the nominal value of 90° may be provided as an estimate of the I-Q disbalance of the COR under test. A slope of the measured dependence $\Delta\Phi_{IQ}(F)$ of the IQ phase shift versus the modulation frequency F, i.e., $d[\Delta\Phi_{IQ}(F)]/dF$, provides information about the IQ skew and may also be computed by the controller 170 and/or the recorder 160 based on the measured dependence $\Delta\Phi_{IQ}(F)$ of the IQ phase shift between the output I and Q signals of the COR under test on the modulation frequency F.

Due to the nominally 90° phase shift between the intermediate-frequency oscillations in the I and Q signals at the output of the COR under test, the oscillations at the intermediate frequency f should cancel out when the total signal power $P_Z(t)=I_Z^2(t)+Q_Z^2(t)$ in both the I and Q channels is measured. Here, the subscript 'Z' stands for either of the polarization plane indices 'X' or 'Y' to indicate output signals in either of the two polarization planes 'X' and 'Y' of the COR under test. Indeed, if the 'I'-channel output from the COR is proportional to a sine of the intermediate frequency f i.e., $\sin(2\pi)$, the 'Q'-channel output from the same optical mixer in the COR, i.e., of the same polarization plane, should be proportional to the cosine of the intermediate frequency f, i.e., $\cos(2\pi f)$. Since $\sin^2(a)+\cos^2(a)=1$, the spectral components in the output power signal $P_Z(t)$ at the intermediate frequency f and the shifted modulation frequencies $(F \pm f)$ should cancel out, while the amplitude modulation at the modulation frequency F is restored.

In one embodiment the recorder 160 or controller 170 may be configured to determine the polarization skew of the COR under test 250 by comparing time-domain traces of the recovered amplitude modulation of the output power signals $P_X$ and $P_Y$ at the base modulation frequency F in the two polarization planes. In one embodiment, in order to determine the polarization skew of the COR under test, the recorder 160 and/or the controller 170 may be configured to simultaneously record the Ix, Qx, Iy, and Qy signals $144_1$, $144_2$, $144_3$ and $144_4$ of the two polarization planes from the COR under test, to compute amplitude modulated signals $A_X(t)$ and $A_Y(t)$ representative of total output power of both I and Q signals for each polarization plane as function of time t, and to determine a relative phase $\Delta\Phi_{XY}(F)$ between time-domain traces of frequency components of the respective amplitude modulated signals at the modulation frequency F. This process may include: a) summing the squares of I and Q output signals separately for each of the X and Y polarization planes of the COR under test to obtain the amplitude modulated signals $A_X(t)$ and $A_Y(t)$ of the two polarization planes as functions of time, as described by the following equations:

$$A_X(t)=(Ix)^2\pm(Qx)^2$$

and $$A_Y(t)=(Iy)^2+(Qy)^2$$

b) filtering these power signals with a suitably narrow pass-band filter to obtain time-domain traces $S_X(t)$ and $S_Y(t)$ of their frequency components at the modulation frequency F, and c) comparing these traces to determine a relative time shift $\Delta\tau_{XY}$ between the time domain traces of the power modulation components of the two polarization planes of the COR.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Thus, such other embodiments and modifications are intended to fall within the scope of the present disclosure. For example, FIG. 15 illustrates an embodiment of the test apparatus of FIG. 1 wherein, instead of splitting the light from one coherent optical source into the first and second lights and frequency shifting one of the lights, two very stable and spectrally closely spaced independent lasers 171 and 172 may be used; the lasers may be frequency locked, or may emit at optical frequencies that differ by the optical shift f, and have narrow spectral linewidth that are less than f. It will be appreciated that two such lasers may also be used in other embodiments of the test apparatus of the present disclosure, such as for example those illustrated in FIGS. 6 and 8.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method for measuring a characteristic of a coherent optical receiver (COR) that comprises one or more optical mixers followed by one or more differential photodetectors, the method comprising:
   a) providing first light that is modulated in amplitude at a modulation frequency F into a first optical signal port of the COR and a local oscillator (LO) port of the COR;
   b) providing second light that is coherent with the first light and is shifted in optical frequency from the first light by a frequency shift f<F into a second optical signal port and the LO port of the COR;
   c) recording one or more output COR signals from one or more output ports of the COR; and
   d) comparing a first frequency component of the one or more output COR signals to a second frequency component thereof to determine the characteristic of the COR.

2. The method of claim 1 including:
   splitting light from a coherent light source to obtain the first and second lights,
   frequency shifting one of the first and second lights by the frequency shift f, and
   modulating the first light in amplitude at the modulation frequency F.

3. The method of claim 2 wherein the one or more output COR signals comprises a first output signal, wherein the first frequency component comprises a frequency component of the first output signal at a shifted modulation frequency (F−f) or (F+f) and the second frequency component comprises a frequency component of the first output COR signal at the modulation frequency F, and wherein (d) comprises:
   determining relative signal strengths of the first frequency component and the second frequency component; and
   computing a common mode rejection ratio (CMRR) for the COR based at least in part on the relative strengths of the first and second frequency components.

4. The method of claim 3 further comprising varying the modulation frequency F to obtain the CMRR at a plurality of frequencies.

5. The method of claim 3 further comprising determining relative input optical powers of the first and second lights at the LO and signal ports of the COR, wherein step (d) comprises computing the CMRR based in part on the relative input optical powers.

6. The method of claim 3, wherein step (d) comprises determining signal strength of the first output signal at one or more harmonics nF of the modulation frequency F and at corresponding one or more shifted harmonics (nF−f) and (nF+j), wherein the method further comprises measuring relative strengths of said harmonics in the first light.

7. The method of claim 2 wherein the step of modulating comprises passing the first light through a Mach-Zehnder modulator (MZM) that is modulated with a sinusoidal electrical signal at the modulation frequency F and is biased at or near a quadrature point thereof, wherein the sinusoidal voltage signal is characterized by an amplitude that is less than half of a characteristic Vπ voltage of the MZM.

8. The method of claim 1 wherein the one or more output COR signals comprise an in-phase (I) signal and a quadrature (Q) signal, and wherein (d) comprises:
   d1) applying to one of the I and Q signals a pass-band filter at the shifted modulation frequency (F+f) or (F−f) to obtain the first frequency component;
   d2) applying to one of the I and Q signals a pass-band filter at the shifted modulation frequency (F+f) or (F−f) to obtain the second frequency component;
   d3) determining an IQ phase difference $\Delta\Phi_{IQ}$ between the first and second frequency components;
   d4) repeating steps (d1) to (d3) for a plurality of modulation frequencies F to obtain the IQ phase difference $\Delta\Phi_{IQ}$ as a function of frequency $\Delta\Phi_{IQ}(F)$; and
   d4) estimating at least one of:
      an IQ skew based on a slope of the IQ phase difference $\Delta\Phi_{IQ}(F)$ as a function of frequency, and
      an I-Q phase disbalance in the COR based on an extrapolation of the IQ phase difference $\Delta\Phi_{IQ}(F)$ to zero frequency.

9. The method of claim 1 wherein the one or more output COR signals comprise an in-phase signal (Ix) and a quadrature signal (Qx) of a first polarization plane 'X' and an in-phase signal (Iy) and a quadrature signal (Qy) of a second polarization plane 'Y', and wherein (d) comprises:
   d1) summing squares of the Ix and Qx signals to obtain a power signal Ax of the first polarization plane 'X' of the COR;

d2) summing squares of the Iy and Qy signals to obtain a power signal Ay of the second polarization plane 'Y' of the COR; and d3) estimating a time delay $\Delta\tau_{XY}$ between frequency components of the power signals Ay and Ax at the modulation frequency F to determine a polarization skew of the COR.

10. An apparatus for measuring a characteristic of a coherent optical receiver (COR) that comprises one or more optical mixers followed by one or more differential photodetectors, the apparatus comprising:

one or more coherent light sources configured to provide first and second lights with an optical frequency shift f therebetween;

first and second output optical ports for coupling one of the first and second lights into a local oscillator (LO) port of the COR and the other of the first and second lights into an optical signal port of the COR;

an optical modulator disposed in an optical path of the first light and operable to modulate the first light in amplitude at a modulation frequency F>f, an electrical signal recorder configured to connect to an output port of the COR and to record an output COR signal received therefrom, said output COR signal comprising a first frequency component and a second frequency component; and a controller coupled to the electrical signal recorder and configured to determine the characteristic of the COR based at least in part on the first and second frequency components.

11. The apparatus of claim 10 wherein the one or more coherent light sources comprise a first coherent light source, a polarization maintaining beam splitter disposed for splitting light from the first coherent light source into the first and second light beams, and an optical frequency shifter disposed in an optical path of one of the first and second lights and operable to shift an optical frequency of light passing therethrough by the optical frequency shift f.

12. The apparatus of claim 11 wherein the optical frequency shifter comprises an acousto-optic modulator.

13. The apparatus of claim 10 wherein the optical modulator comprises a Mach-Zehnder modulator (MZM).

14. The apparatus of claim 11 further comprising a polarization rotator disposed in an optical path of one of the first and second lights to the signal optical port of the COR.

15. The apparatus of claim 10 further comprising a frequency-variable electrical signal generator coupled to the optical modulator and configured to generate an electrical modulation signal at the modulation frequency F, wherein the controller is coupled to the frequency-variable electrical signal generator and is configured to vary the modulation frequency F and to compute the characteristic of the COR at a plurality of values of the modulation frequency F.

16. The apparatus of claim 15 configured for measuring a common mode rejection ratio (CMRR) of the COR, wherein the electrical signal recorder is configured to record a time-domain trace of the received signal, and wherein the controller is configured to process said trace to determine therefrom a relative signal strength of the first frequency component measured at the shifted modulation frequency (F−f) or (F+f) relative to the second frequency component measured at the modulation frequency F, and to compute the CMRR based at least in part on the relative signal strength of the first and second frequency components.

17. The apparatus of claim 16 wherein the optical modulator comprises a Mach-Zehnder modulator (MZM) that is configured to be biased at or near a quadrature point, and wherein the electrical signal generator is configured to generate the electrical modulating signal in the form of a voltage sine wave at the modulation frequency F with an amplitude that is less than half of a characteristic Vπ voltage of the MZM.

18. The apparatus of claim 16, further comprising an optical power meter disposed to measure optical power of the first and second lights at the output optical ports, wherein the controller is coupled to the optical power meter and configured to compute the CMRR based in part on the measured optical power of the first and second lights.

19. The apparatus of claim 16 including an optical spectrum analyzer disposed to measure optical spectrum of the first light after the optical modulator at one or more harmonics of the modulation frequency F.

20. A method for measuring a characteristic of a coherent optical receiver (COR) that comprises one or more optical mixers followed by one or more differential photodetectors, the method comprising:

splitting light from a coherent light source into first and second lights;

frequency shifting one of the first or second lights by a frequency shift f;

modulating the first light in amplitude at a modulation frequency F that is greater than f, providing one of the first and second lights into a signal port of the COR, and the other of the first and second lights into a local oscillator (LO) port of the COR;

recording an output signal of the one or more differential photodetectors, said output signal comprising a first frequency component at a shifted modulation frequency (F−f) or (F+f) and a second frequency component; and determining the characteristic of the COR based at least in part on the first and second frequency components.

* * * * *

UNITED STATES PATENT AND TRADEMARK OFFICE
CERTIFICATE OF CORRECTION

PATENT NO. : 9,806,806 B1
APPLICATION NO. : 15/203939
DATED : October 31, 2017
INVENTOR(S) : Bernd-Harald Horst Jurgen Rohde et al.

Page 1 of 1

It is certified that error appears in the above-identified patent and that said Letters Patent is hereby corrected as shown below:

In the Claims

At Column 24, Line 30 (Claim 6, Line 5), delete "(nF+j)," and insert --(nF+f),-- therefor.

Signed and Sealed this
Second Day of January, 2018

Joseph Matal
*Performing the Functions and Duties of the*
*Under Secretary of Commerce for Intellectual Property and*
*Director of the United States Patent and Trademark Office*